United States Patent [19]

Andrejasich et al.

[11] Patent Number: 4,835,522
[45] Date of Patent: May 30, 1989

[54] TANK INVENTORY AND LEAK DETECTION SYSTEM

[75] Inventors: Raymond J Andrejasich, Carmel; Laurence S. Slocum; Sara M. Mussmann, both of Indianapolis, all of Ind.

[73] Assignee: Emhart Industries, Inc., Indianapolis, Ind.

[21] Appl. No.: 116,920

[22] Filed: Nov. 5, 1987

[51] Int. Cl.⁴ .......................... G08B 19/00; G01M 3/32
[52] U.S. Cl. ...................................... 340/521; 73/49.2
[58] Field of Search ........................ 340/521, 522, 605; 73/61.1 R, 49.2 T, 291, 292

[56] References Cited

U.S. PATENT DOCUMENTS

| | | | |
|---|---|---|---|
| 4,116,045 | 9/1978 | Potter | 73/61.1 R |
| 4,221,125 | 9/1980 | Oliver et al. | 73/61.1 R |
| 4,231,025 | 10/1980 | Turner, Jr. | 340/521 |
| 4,571,987 | 2/1986 | Horner | 73/49.2 |
| 4,604,893 | 8/1986 | Senese et al. | 73/49.2 |
| 4,646,069 | 2/1987 | Andrejasich et al. | 340/603 |
| 4,646,560 | 3/1987 | Maresca, Jr. et al. | 73/49.2 |
| 4,660,026 | 4/1987 | Chandler | 340/604 |
| 4,733,224 | 3/1988 | Kimura | 340/521 |
| 4,740,777 | 4/1988 | Slocum et al. | 340/522 |

FOREIGN PATENT DOCUMENTS 0106677 10/1983 United Kingdom .

*Primary Examiner*—Levy Stewart J.
*Assistant Examiner*—Joseph W. Roskos
*Attorney, Agent, or Firm*—Carl A. Forest

[57] ABSTRACT

A controller including a digital processor is connected to flow meters and overfill gauges suitable for placement in the fill ports of underground storage tanks at, for example, a gasoline service station. The station dispenser pumps are also connected to the controller. In addition, probes, including tank liquid level probes, line pressure probes, and leak probes capable of detecting small quantities of liquid leaking from the system, are also connected to the controller. Processor software programs use stored decision criteria relating liquid conditions external of the storage tank system and liquid conditions internal of the storage tank system and its contents to provide audio and visual indications of the status of the liquid storage system and its contents.

7 Claims, 20 Drawing Sheets

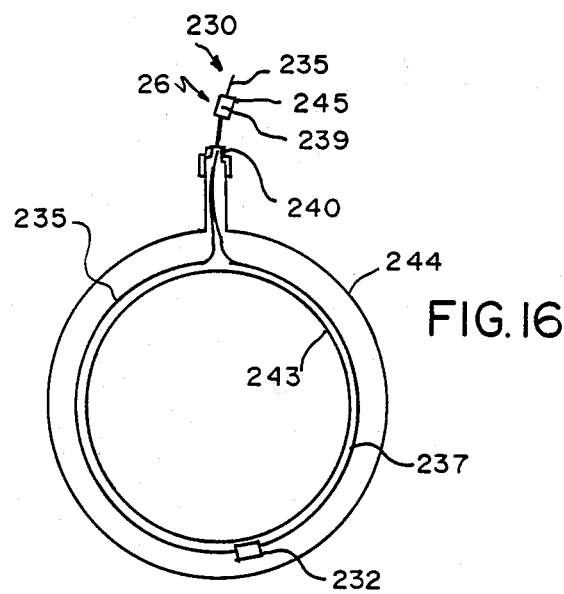

TANK INVENTORY AND LEAK DETECTION SYSTEM

BACKGROUND OF THE INVENTION

1. Field of the Invention

The invention in general relates to liquid status detectors, such as those that detect hydrocarbon liquid leaking from underground storage tanks, and in particular a detector that combines both internal tank inventory sensors and external leak sensors in a single system.

2. Description of the Prior Art

U.S. Pat. No. 4,221,125, on an invention of John N. Oliver and Louis M. Sandler, U.S. Pat. No. 4,646,069 issued to Raymond J. Andrejasich et al, U.S. Pat. No. 4,660,026 issued to Brian L. Chandler and U.S. Pat. No. 4,116,045 on an invention of Bronson M. Potter, are exemplary of systems for detecting the presence of leaking liquid. Typically such systems include leakage probes that are buried in the vicinity of hydrocarbon storage tanks, placed between the walls of double-walled hydrocarbon storage tanks, or otherwise placed externally of storage tanks to detect liquid leaking from the tanks. The probes are generally connected via wires to a central controller, which may be located, for example, in a service station office, and which monitors the probe status. In addition, a wide variety of systems have been known for many years for measuring the liquid level within tanks for the purposes of gauging the amount of liquid in the tank and or for detecting the leakage of liquid from the tank. See for example U.S. Pat. No. 2,775,748 issued to R. L. Rod, et al, U.S. Pat. No. 3,017,771 issued to F. R. Bonhomme, U.S. Pat. No. 4,571,987 issued to J. A. Horner, U.S. Pat. No. 4,604,893 issued to F. J. Senese, et al; U.S. Pat. No. 4,637,254 issued to J. F. Dyben, et al; U.S. Pat. No. 4,646,560 issued to J. W. Maresca, Jr., et al, and U.S. Pat. No. 4,646,569 issued to H. F. Cosser and European Patent Application No. 1,106,677 on a disclosure of J. S. Haynes. The foregoing references reflect just a small portion of the available liquid level measuring devices. Despite the extensive research and development that has gone into liquid level gauging, the preferred method of taking inventory in underground storage tanks remains the dipstick. The present invention has for the first time combined external leak detection sensors with internal level gauging sensors in a unique system which results in important advantages, particularly for underground gasoline storage tanks, which system makes electronic inventory control practical.

SUMMARY OF THE INVENTION

It is an object of the invention to provide a liquid status detector having both external leak detection sensors and internal liquid level gauging sensors.

It is a further object of the invention to provide the above object in a liquid status detector in which the ability to detect small quantities of liquid external of a liquid storage tank enhances the ability of the system to accurately determine the amount of liquid in the system.

It is a further object of the invention to provide a liquid status detector in which sensors internal of a liquid storage system enhance the ability of sensors external of the storage system to detect and locate leaks in the storage system.

The invention provides a tank inventory and leak detection system comprising: external detection means for detecting one or more conditions of liquid external of the storage system and for providing an external liquid signal; internal detection means for detecting one or more conditions of liquid internal of the storage system and for producing an internal liquid signal; means for storing decision criteria relating one or more of the external liquid conditions and one or more of the internal liquid conditions; and indicating means communicating with the means for storing and responsive to the external liquid signal and the internal liquid signal for providing an indication of the status of the liquid storage system and its contents. The external detection means preferably comprises a means for detecting the presence of a small quantity of hydrocarbon liquid. The external detection means preferably further comprises float means configured to fit within the collecting means and occupying the major portion of its volume at the liquid-float interface, and a sensing means attached to the float for providing the external liquid signal. Alternatively, the external detection means comprises a vapor sensor and a means for locating the vapor sensor between the walls of and near the bottom of a double-walled tank. Preferably the internal detection means comprises measurement means for measuring the quantity of liquid in the storage system. Preferably the measurement means comprises liquid level means for measuring the liquid level in the storage system and at least one temperature sensor means for sensing the temperature of the liquid in the storage system. Preferably the means for storing comprises means for storing decision criteria for determining the location of a leak in the liquid storage system and the indicating means includes means for indicating the location of a leak in the liquid storage system.

Heretofore, internal tank level gauging systems have not been trustworthy. Relatively large level changes corresponding to significant volume changes can be caused by relatively common changes in liquid temperature, for example. As another example, standing waves between layers of liquid at different temperatures can exist for relatively long periods and disrupt sensing systems. Further, the most common form of leakage, i.e., leakage from couplings and connecting piping may occur during volume transfers which can mask them. However, it has been discovered that properly placed external leak detectors can detect minute quantities of leaking liquid. For example, it has been found that leaked fluids tend to collect in sumps and small amounts, e.g, a cupful, can quickly be detected. In the present invention sensitive external leakage sensors are used to check the internal gauging system eliminating many false alarms which plagued previous systems. Numerous other features, objects and advantages of the invention will become apparent from the following detailed description when read in conjunction with the accompanying drawings.

BRIEF DESCRIPTION OF THE DRAWINGS

In the drawings:

FIG. 16 shows an exemplary placement of the sensor of FIG. 15 between the walls of a double-walled tank;

FIG. 17 is a flow chart showing the preferred main microprocessor program according to the invention;

FIG. 18 is a block diagram of the preferred fill flow unit;

DESCRIPTION OF THE PREFERRED EMBODIMENT

Figure 1A:
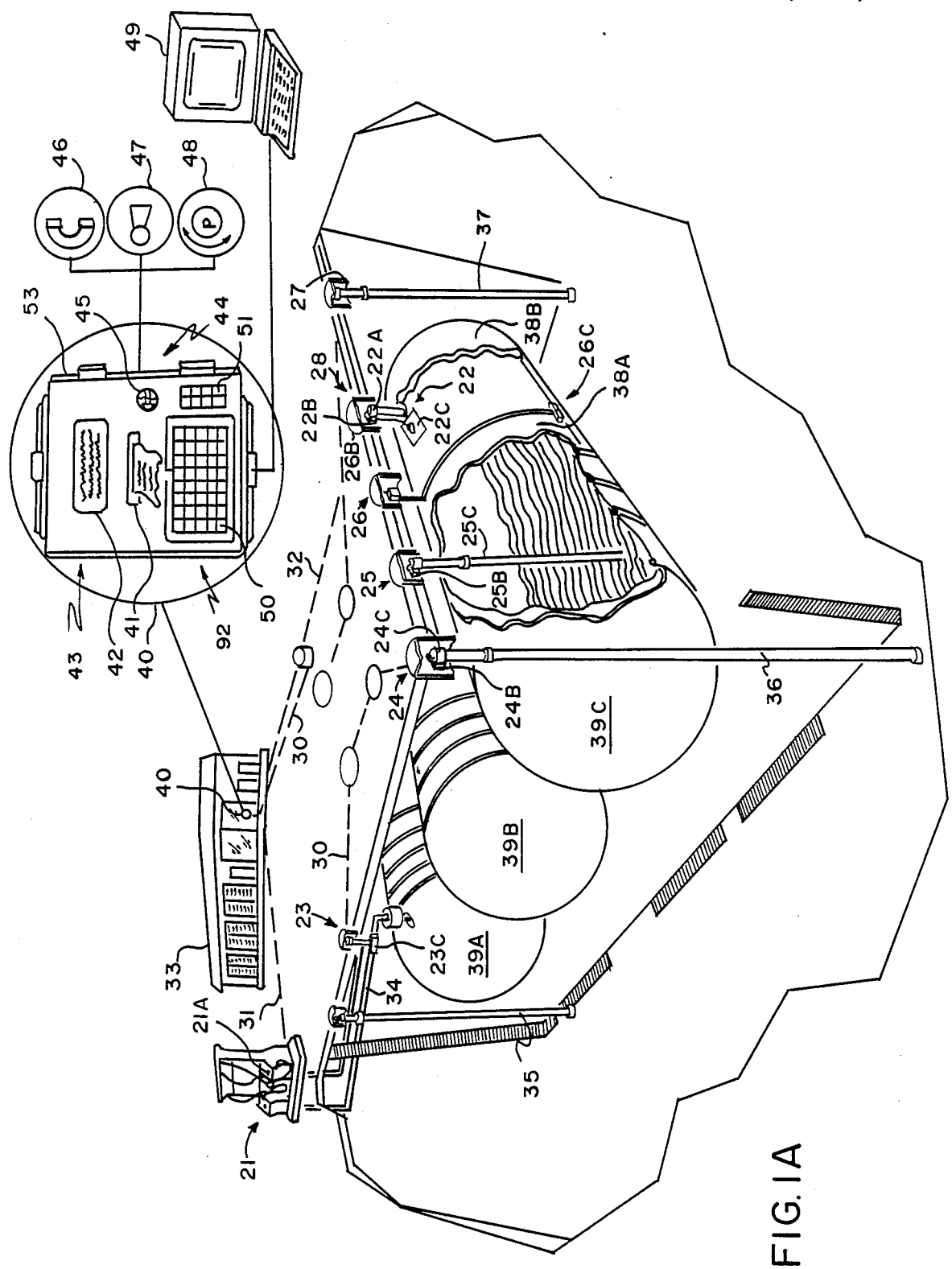
FIG. 1A is a diagrammatic view of a preferred embodiment of a tank inventory and leak detector system according to the invention in a typical operating environment.
Figure 1B:
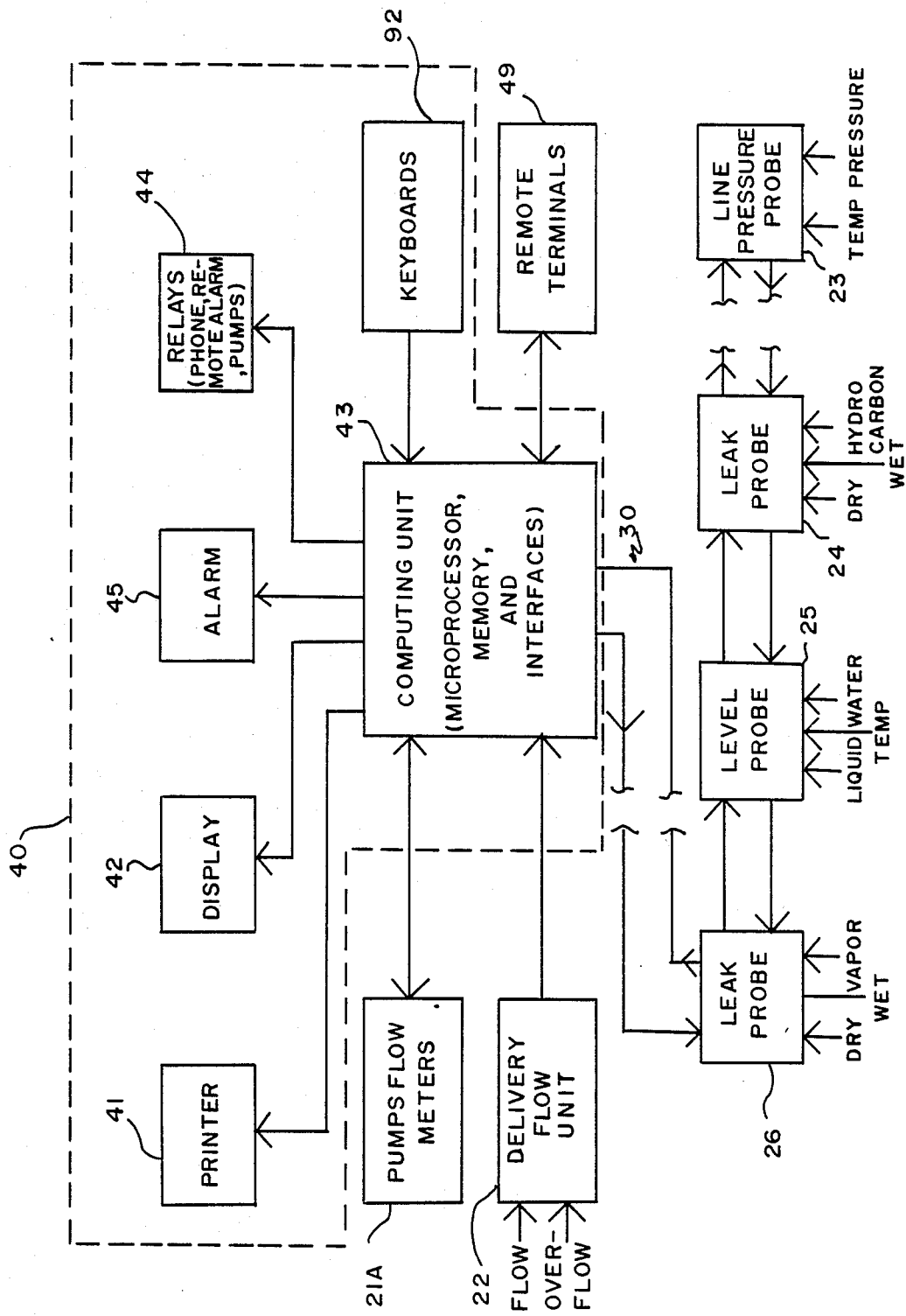
FIG. 1B is a block diagram of the preferred embodiment of the invention.

FIG. 1A illustrates the preferred embodiment of the invention as it may be installed at a gasoline station. FIG. 1B is a block circuit diagram of the preferred embodiment of the invention. A controller 40, which preferably includes a computing unit 43, a printer 41, a display 42, an audible-alarm 45, relays 44 and keyboards 92, is located in an office in service station 33. The controller 40 receives inventory input data over transmission line 32, inventory output data over transmission line 31, and liquid status information over transmission line 30. A flow unit 22 includes a flow meter 22A located in tank fill port 28 and an overflow gauge 22C, which provide inventory input data to controller 40 via line 32. Flow meters such as 21A, in pumps 21 provide inventory output data to controller 40 via line 31. Sensing probes, such as 23 through 27, detect the status of their environment and provide signals over transmission line 30 to the controller 40. Some probes, such as 24 and 27 extend down wells, such as 36 and 37 respectively, external to gasoline tanks 39A, 39B and 39C. Others such as 26, are placed between the walls 38A and 38B of a double-walled tank such as 39C. Other probes, such as 25 extend inside the tanks to measure the liquid level in the tanks. Still other probes, such as 23 measure the pressure in liquid transfer pipes such as 34. The invention contemplates that other types of probes may also be used. For simplicity, only exemplary probes are shown in FIG. 1B.

Figure 2:
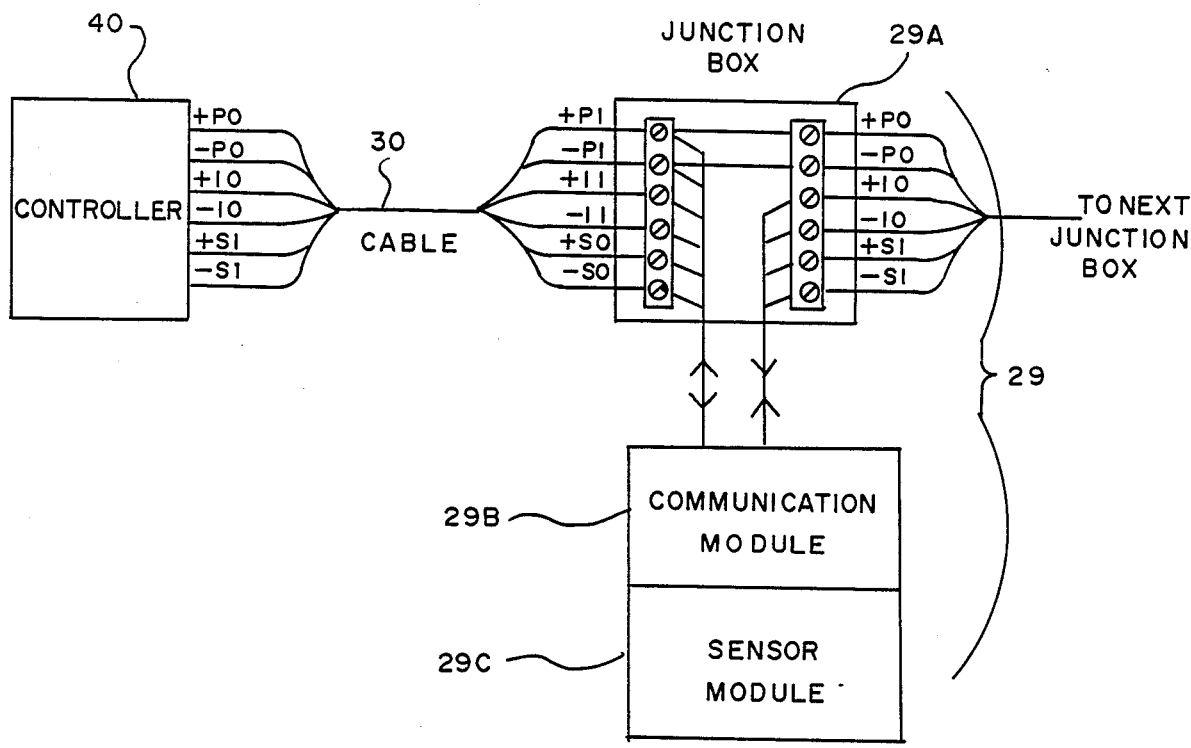
FIG. 2 is a block diagram showing details of the interconnection of the controller and probes shown in the embodiments of FIGS. 1A and 1B.
Figure 4:
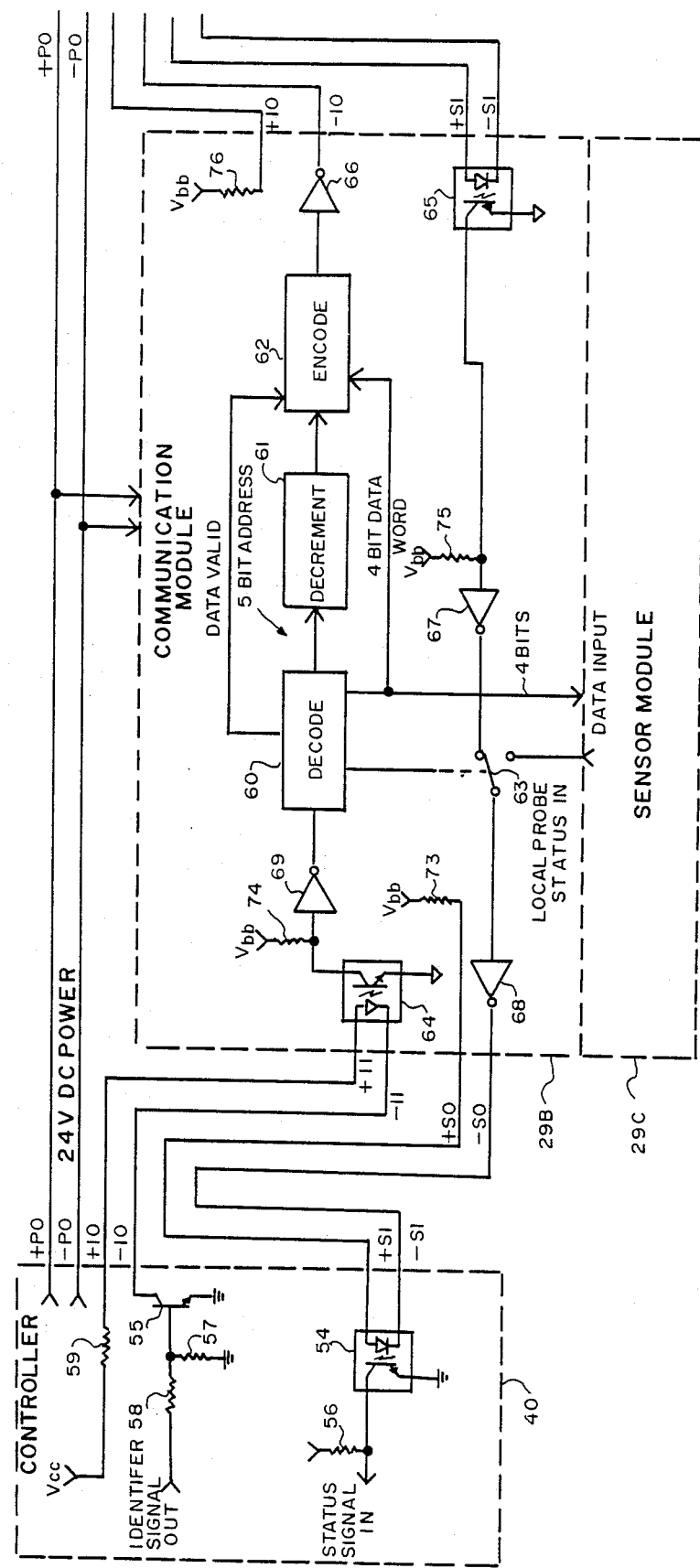
FIG. 4 is a block circuit diagram of the probe communications network of the embodiment of FIG. 2.

Each probe includes a probe communication module, such as 24B and 25B, a typical one of which is shown in FIGS. 2 and 4 at 29B. Each probe also includes a sensor module, such as 24C and 25C, a typical one of which is shown in FIGS. 2 and 4 at 29C. As will be seen in detail below, each communication module is essentially identical while the sensor module may vary widely depending on the particular physical condition it is intended to detect.

Figure 3:
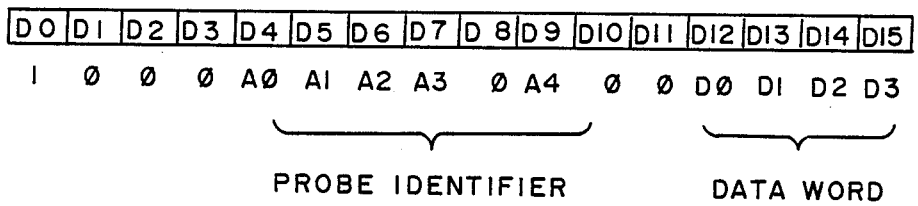
FIG. 3 shows a preferred format for a digital command output by the controller.
Figure 9:
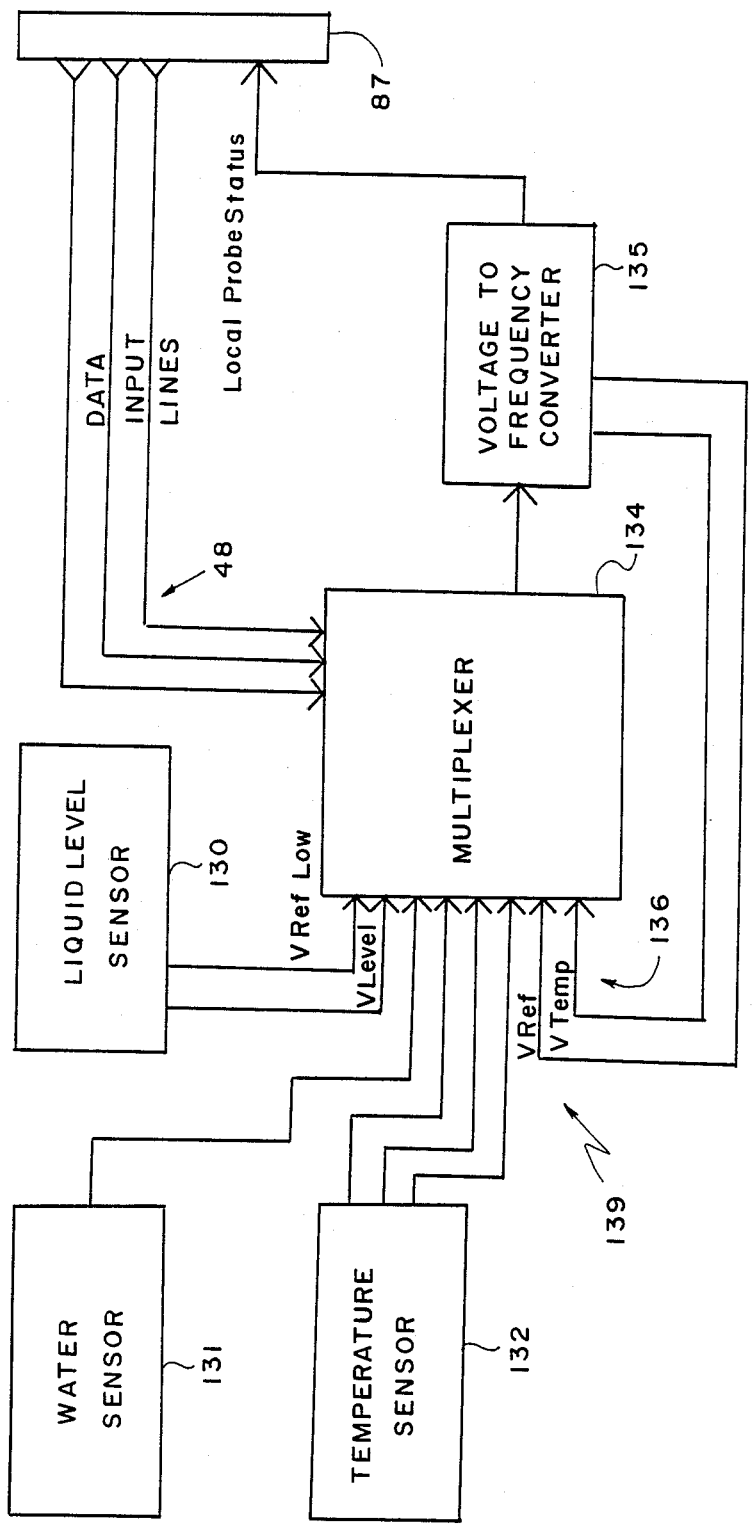
FIG. 9 is a block diagram of a liquid level sensor module according to the invention.
Figure 10:
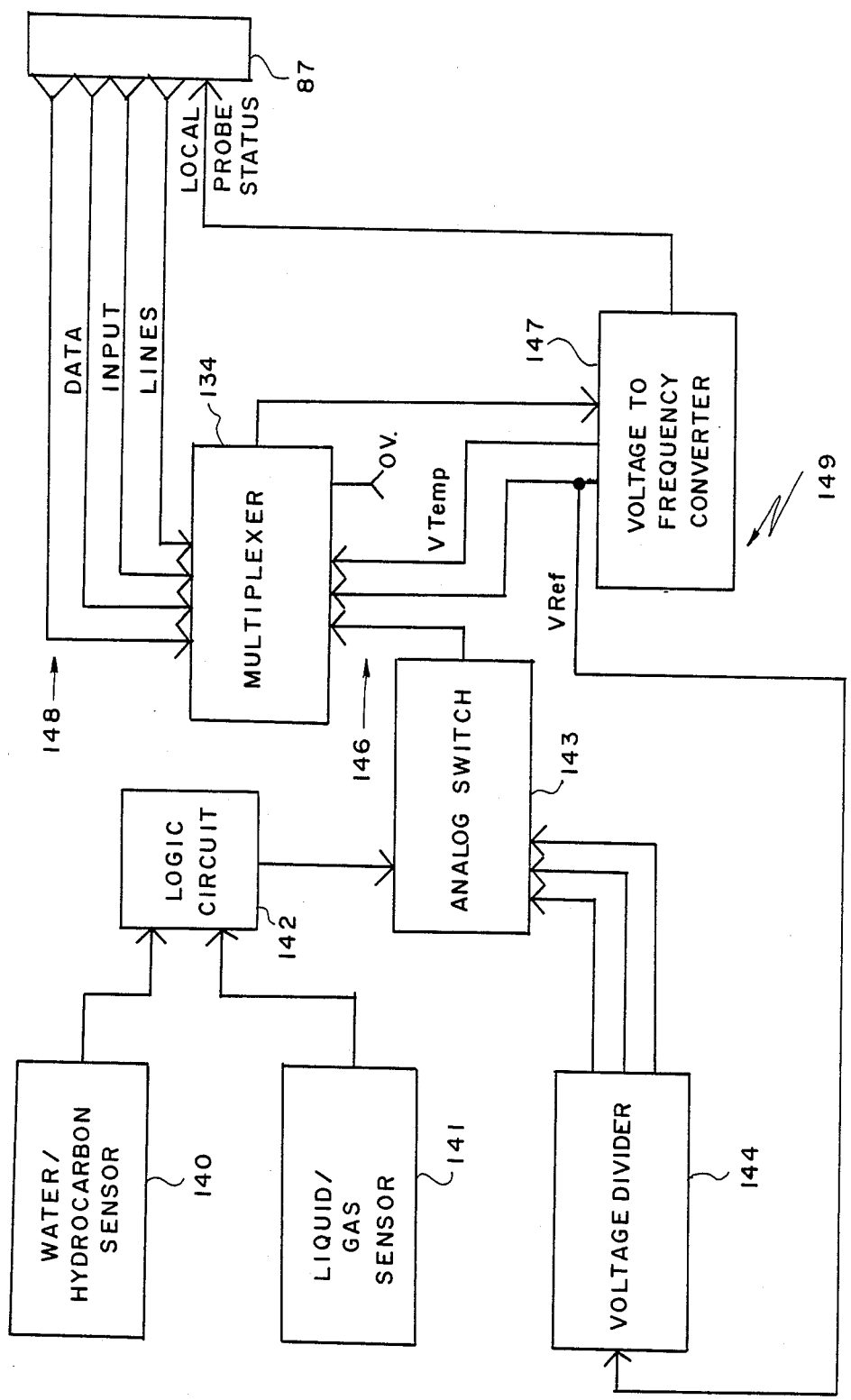
FIG. 10 is a block diagram of a leak sensor module according to the invention.

In the preferred embodiment inventory data is provided to controller 40 by flow meters in pumps 21 and in delivery ports such as 28 whenever liquid is added to or removed from the tanks 39A, 39B and 39C. Probe data is requested by the controller 40 via a command signal at frequent intervals. The command signal preferably comprises a probe identifier signal and a data signal formatted as shown in FIG. 3. The command signal is passed along transmission line 30 from the controller 40 to the probe communicator modules, such as 29B. The signal is decoded within the communication module (see FIG. 44) and the data signal is passed to the sensor module such as 29C. Typical sensor modules are shown in FIGS. 9 and 10. In these modules the data signal is passed via data input lines such as 48 and 148 to a multiplexer 134. Sensors such as 130, 131, 132, 140 and 141 in the sensor modules provide status signals to the multiplexer 134 over channels 136 and 146. The information in the data signal tells the multiplexer which data channel to select, and the multiplexer applies the signal on the selected channel to a voltage to frequency converter such as 135 and 147, which converter outputs an oscillating signal which is applied to the probe output—SO (FIGS. 2, 4 and 5) through the communication module 29B switch 63 when the identifier signal which agrees with a local probe address is applied to decoder 60.

Upon receiving the oscillating signal from the probes, the controller status signal interface 96 (FIG. 6) counts the number of oscillations occurring over a predetermined time period and presents the count to a processor 90 which utilizes decision criteria stored in memory 91 to provide an indication of the system status which may take the form of messages on printer 41 or liquid crystal display 42, an alarm on audio alarm 45, an external alarm via relays 44 which may activate a recorded message on phone 46 or speaker 47, or a report on an external data terminal 49. Or the status signals in combination with the decision criteria could cause the processor to trigger a pump 48 to remove leaking pollutants. Keyboards 50 and 51 on controller 40 may be used to input data, commands and otherwise communicate with the system.

Turning now to a more detailed description of the preferred embodiment of the invention, FIG. 2 shows the interconnection between the probes and the controller. The controller 40 is connected to the probes via a transmission line 30 which in the preferred embodiment is a six-wire cable. Each probe, such as 29, preferably includes a junction box, such as 29A, a communication module, such as 29B, and a sensor module, such as 29C. Preferably the junction box (29A) and the communication module (29B) are identical for each probe. The sensor module may be a liquid sensor in a well such as 35 (FIG. 1A), a liquid level sensor such as 25C, a between-the-wall vapor sensor such as 26B, a line pressure sensor such as 23C, or any one of a number of different liquid status sensors. Examples of such sensors are described below in reference to FIGS. 9-16. Communications modules are shown at 24B, 25B and 26B in FIG 1A. The junction boxes are not shown in FIG. 1A as the scale is not sufficient to show them clearly. The junction box and the communication module will be discussed in terms of the junction box 29A and communication module 29B, although it is understood that these portions are preferably the same for all probes. The preferred communication module is discussed below with reference to FIGS. 2, 4 and 5. The controller includes a positive power output terminal (+PO), a negative power output terminal (−PO), a positive identifier signal output terminal (+IO), a negative identifier signal output terminal (−IO), a positive status signal input terminal (+SI), and a negative status signal input terminal (−SI). The junction box 29A includes, at the left, positive and negative input power terminals (+PI, −PI), positive and negative identifier signal input terminals (+II, −II), positive and negative status signal output terminals (+SO, −SO) each of which are connected to the corresponding terminal on the controller (+PI to +PO, −PI to −PO, +II to +IO, etc.). On the right the junction box includes positive and negative power output terminals (+PO, −PO), positive and negative identifier signal output terminals (+IO, −IO) and positive and negative status signal input terminals (+SI, −SI) which are connected to the corresponding terminals on the next junction box (+PO to +PI, −PO to −PI, +IO to +II, −IO to −II, +SI to +SO and −SI to −SO). The junction box terminals are connected to the communication module as will be clear from the discussion of FIGS. 4 and 5.

In the preferred embodiment, the identifier signal is part of a 16-bit digital Manchester encoded command sent by the controller 40 to the probes. The format for this command is shown in FIG. 3. The first four bits and the eleventh and twelfth bits are fixed. A0 through A4 represent the identifier signal. Up to 32 probes may be addressed by these 4 bits. D0 through D3 represent a data word which may be used to control the sensor module. This word may be used to address one of sixteen data channels.

FIG. 4 shows a block circuit diagram of the system communication network. The communication network portions of the controller include optocoupler 54, transistor 55 and resistors 56, 57, 58 and 59. Resistor 59 is connected between the Vcc internal power source (an approximately 5 volt power supply) of the controller and +IO output terminal. The collector of transistor 55 is connected to the −IO output terminal. The emitter of transistor 55 is connected to ground and the base is connected to ground through resister 57 and to the identifier signal (digital word) output through resister 58. The positive status signal input terminal (+SI) is connected to the anode of the optocoupler diode, and the negative status signal input terminal (−SI) is connected to the cathode. The emitter of the optocoupler is connected to ground while the collector is connected to the Vcc power supply through resistor 56 and to the status signal input.

The communication module includes decode circuitry 60, decrement circuitry 61, encode circuitry 62, optocouplers 64 and 65, inverters 66, 67, 68 and 69 and resistors 73, 74, 75 and 76. The identifier signal input terminals +II and −II are connected across the optocoupler 64 diode with the positive connected to the anode and the negative connected to the cathode. The emitter of optocoupler 64 is connected to the probe ground and the collector is connected to the probe power supply Vbb (an approximately 5 volt power source) through resistor 74 and to the input of inverter 69. The output of inverter 69 is connected to the input of the decode logic 60. The decode logic compares the 5-bit probe identifier address A0 through A4 to the local address, and if it matches, places a signal on the select (sel) output which is applied to switch 63 to cause it to switch to the local probe status in line. If the identifier address does not match the local address it is sent to decrement logic 61 where it is decremented by one and passed to the encode logic 62. A signal is also placed on the select output to cause switch 63 to switch to the status signal probe input. The data word D0 through D3 is passed to the encode logic and to the sensor module data input. The decode logic also checks the digital data word for validity, and if it is valid, it places a signal on the data valid output which is applied to the encode logic 62 to cause it to apply the encoded signal to the input of inverter 66. The output of inverter 66 is connected to the −IO terminal. The +IO terminal is connected to the Vbb power source through resistor 76. The +SI terminal is connected to the anode of the optocoupler 65 diode and the −SI terminal to its cathode. The emitter of the optocoupler 65 is connected to ground and the collector is connected to the Vbb source through resistor 75 and to the input of inverter 67. The output of inverter 67 is connected to the status signal probe input of switch 63. The output of switch 63 is connected to the input of inverter 68. The output of inverter 68 is connected to the −SO terminal, and the +SO terminal is connected to the Vbb power source through resistor 73.

Figure 5:
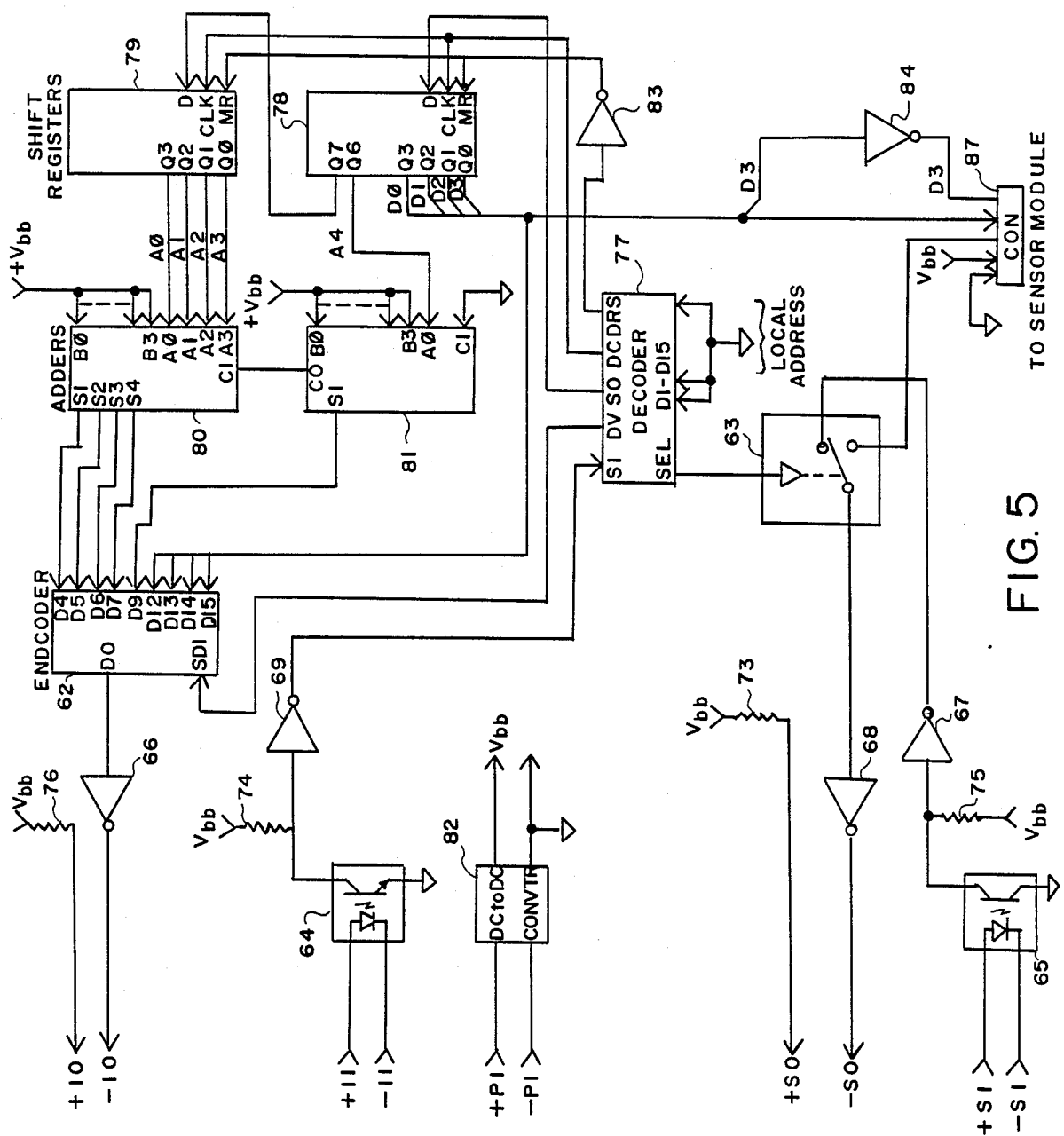
FIG. 5 is a detailed electrical circuit diagram of the communication module of FIGS. 1, 2 and 4.

FIG. 5 is a detailed electrical circuit diagram of the communications module. In addition to the parts discussed in reference to FIG. 4, the circuit includes a DC to DC converter 82, and inverters 83 and 84. The decode logic 60 and decrement logic 61 are implemented together using decoder 77, shift registers 78 and 79 and adders 80 and 81. The encode logic comprises encoder 62. The +PI and −PI inputs are connected to a DC to DC converter which provides isolation of the probe power supply, and ground isolation between probes. The DC to DC converter also permits an input voltage of 24 VDC. This higher distribution voltage reduces the current drain of each probe on the distribution system, thereby reducing the IR losses in the transmission line 30, allowing the use of more probes. The outputs of the converter 81 provide the probe power source Vbb and the probe ground. The numbers within the rectangles representing the IC chips 77, 78, 79, 80, 81 and 62 indicate the inputs/outputs of those chips which are explained in the literature provided with the particular chips (see below). The output of inverter 69 is connected to the SI input of decoder 77. The DV output of decoder 77 is connected to the SDI input of encoder 62. The SO and DC outputs of decoder 77 are connected to the D and CLK inputs respectively of shift register 78. The DC output is also connected to the CLK input of shift register 79. The DRS output of decoder 77 is connected to the MR inputs of shift registers 78 and 79 through inverter 83. The D1 through D15 inputs of decoder 77 are connected to ground. The Q7 output of shift register 78 is connected to the D input of shift register 79 while the Q6 output is connected to the A0 input of adder 81. The Q0 through Q3 outputs of shift register 78 are connected to the D12 through D15 inputs of encoder 62 and also to the sensor module terminal block 87 with the D3 (Q0) line being inverted by inverter 84. The Q0 through Q3 outputs of shift register 79 are connected to the A3 through A0 inputs respectively of adder 80. The B0 through B3 inputs of adders 80 and 81 are connected to the Vbb voltage source. The S1 through S4 outputs of adder 80 are connected to the D4 through D7 inputs respectively of encoder 62. The CI input of adder 81 is grounded. The C0 output of adder 81 is connected to the CI input of adder 80 while the S1 output is connected to the D9 input of encoder 62. The D0 output of encoder 62 is applied to the input of inverter 66. The sensor module ground and voltage source inputs are connected to the communications module ground and voltage source, Vbb, respectively through terminal block 87. The other connections are as discussed in reference to FIG. 4.

In the preferred embodiment, encoder 62 is a Manchester coder/decoder Supertex type ED9, adders 80 and 81 are 4-bit adders National Semiconductor type 74HC283, shift registers 78 and 79 are RCA type CD74HC164, decoder 77 is a Supertex type ED5 Manchester coder/decoder, optocouplers 54, 64 and 65 are Texas Instruments type TIL153's, transistor 55 is a type PN2222, the inverters 66 through 69 and 83 and 84 are a National Semiconductor Schmitt hex inverter type 74HC14, DC to DC converter 81 is a 24 volt to 5 volt converter, resistors 57, 59, 73, and 76 are 1K ohm, 58 is a 2K ohm resistor, resistors 56, 73, 74 and 75 are 10K ohm, and switch 63 is a quad multiplexer type CD74HC157 from RCA.

Figure 6:
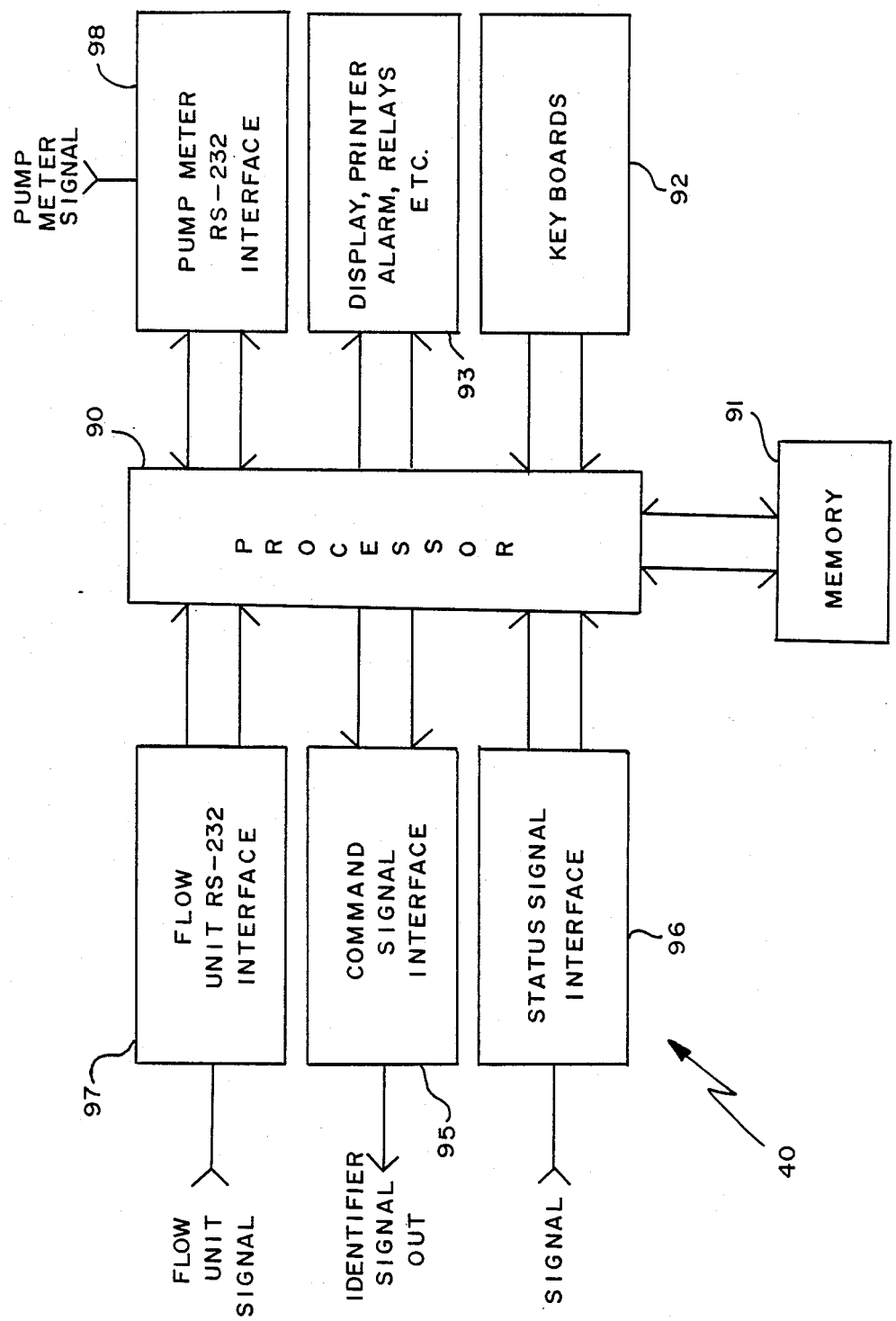
FIG. 6 is a block circuit diagram of the controller of FIGS. 1A and 1B.

FIG. 6 shows a block circuit diagram of the preferred embodiment of the controller 40. It comprises a processor 90, a memory 91, keyboards 92, outputs 93, command signal interface 95, status signal interface 96, flow unit interface 97, and pump meter interface 98. The processor receives instruction from keyboards 92, data from interfaces 96, 97 and 98, and utilizes decision criteria stored in memory 91 to activate appropriate outputs 93. The processor 90, memory 91, keyboards 92 and outputs 93 may be any one of a number of such components that are well-known in the art; as for example the processor, memory, keyboards, displays, etc. described in U.S. Pat. Nos. 4,736,193 and 4,740,777 on inventions of Laurence S. Slocum and Sara M. Mussmann for Programmable Fluid Detectors. Thus, these components will not be discussed further herein. The command signal interface 95 and status signal interface 96 are, however, unique in the field of fluid detectors and therefore will be described in detail. The flow unit interface 97 and the and the pump meter interface 98 are conventional RS-232 interfaces and will not be discussed further herein.

Figure 7:
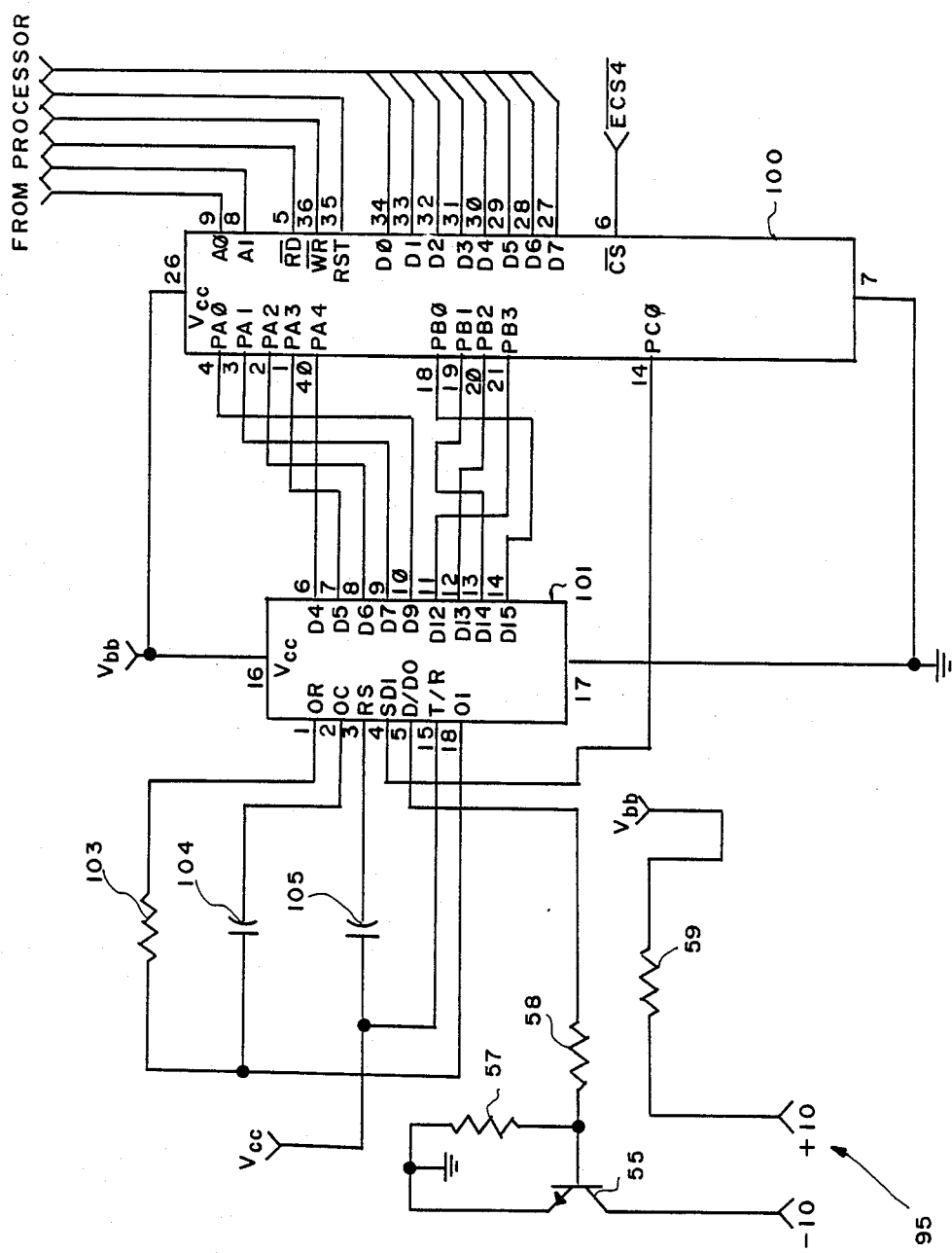
FIG. 7 is a detailed circuit diagram of the controller command signal interface shown.

FIG. 7 shows the detailed circuit diagram for the command signal interface 95. It comprises parallel interface adapter 100, transmitter 101, resistors 103, 57, 58 and 59, and capacitors 104 and 105. The numbers on the integrated circuits, such as parallel interface adaptor 100, near the connecting lines refer to the pin numbers of the circuits, while the letters in the interior refer to the internal signals. The numbers 5, 8, 9 and 27 through 36 pins of the parallel interface adapter are connected to the data and timing outputs of the processor as appropriate to transmit the probe address and sensor module data. The number 6 pin is connected to the device enable circuitry associated with the processor. The number 1 through 4 pins of adapter 100 are connected to the 7 through 10 pins respectively of transmitter 101. The number 40 pin of adapter 100 is connected to the number 6 pin of transmitter 101. The number 18 through 21 pins of adapter 100 are connected to the 14 through 11 pins respectively of transmitter 101. The number 14 pin of adapter 100 is connected to the number 4 pin of transmitter 101. The number 3 pin of transmitter 101 is connected to the system voltage source, Vcc, through capacitor 105, and the number 15 pin is also connected to the Vcc voltage. The number 18 pin of transmitter 101 is connected to the number 2 pin through capacitor 104 and to the number 1 pin through resistor 10. The number 16 pin of transmitter 101 and the number 26 pin of adapter 100 are connected to the Vcc voltage and the number 17 pin of transmitter 101 and the number 7 pin of adapter 100 are connected to ground. The number 5 pin of transmitter 101 provides the output command signal to the probes which is also the Identifier Signal Output shown in FIG. 4.

The command signal interface circuit 95 works as follows. The parallel interface adapter 100 is connected to the processor and other elements of the circuit so as to provide the probe address (identifier signal) on its PA0 through PA4 outputs and the sensor data signal on its PB0 through PB3 outputs. Pin 14 of the adapter 100 strobes the transmitter 101 when the identifier signal and sensor signal is at the adapter outputs and transmitter 101 then transmits the signal as a Manchester encoded serial digital signal on output pin 5. The circuit comprising transistor 55 and resistors 57 and 58 is a buffer circuit, while the circuit comprising resistor 103 and capacitors 104 and 105 is an RC clock which provides the timing for transmitter 101. In the preferred embodiment parallel interface adapter 100 is a type 82C55A and transmitter 100 is a type ED-9 Manchester transmitter while resistor 103 is 40K ohms and capacitors 104 and 105 are 1,000 picofarads and 100 picofarads respectively which provide a 10K hertz timing signal.

Figure 8:
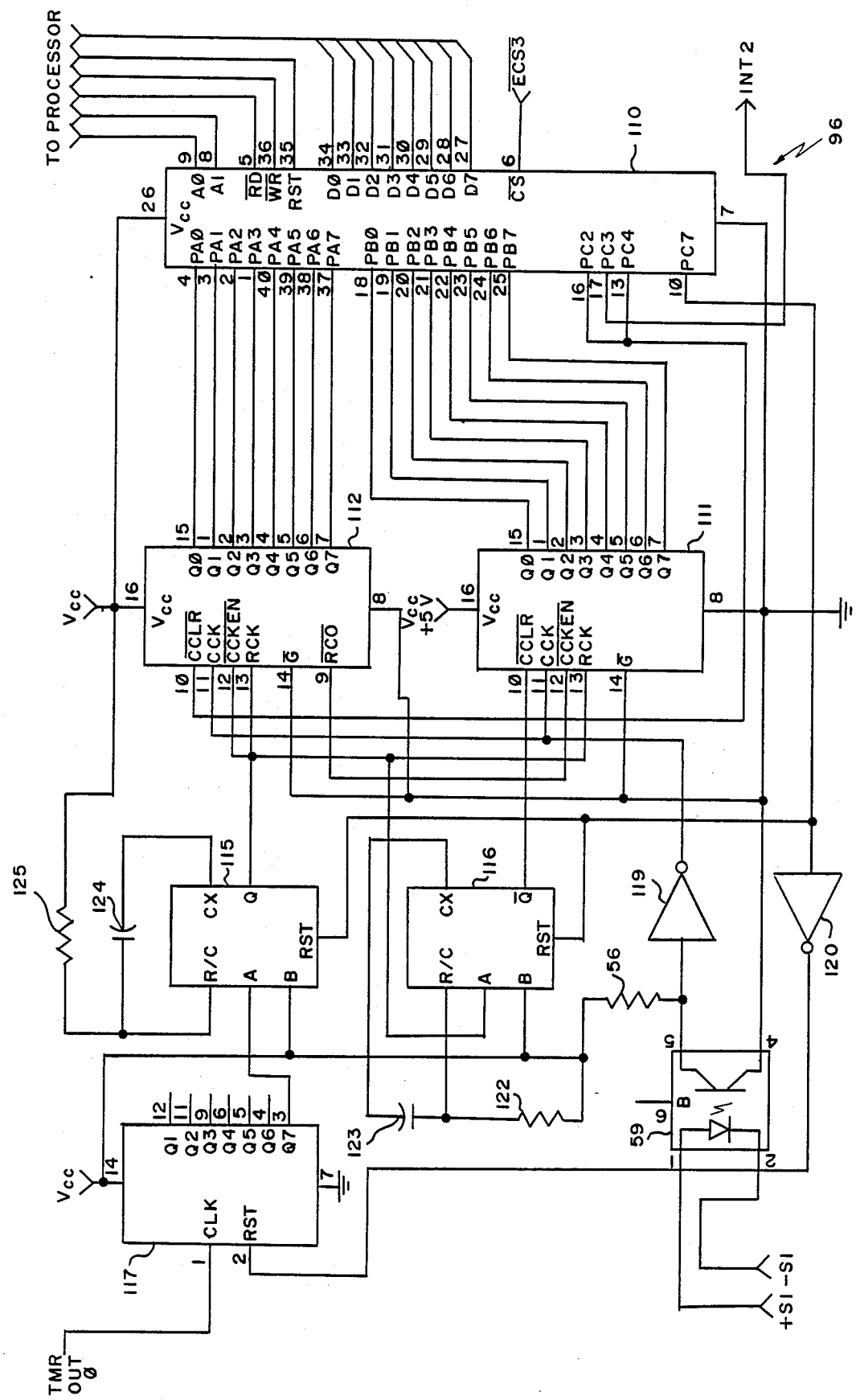
FIG. 8 is a detailed circuit diagram of the controller status signal interface.

Turning now to FIG. 8, the detailed circuitry for the status signal interface 96 is shown. It includes parallel interface adapter 110, counters 111 and 112, one-shot latches, 115 and 116, counter 117, Schmitt-trigger inverters 119 and 120, resistors 56, 122 and 125 and capacitors 123 and 124. The numbers 5,8,9, 17, and 27–36, pins of adapter 110 are connected to the processor 90 and the number 6 pin is connected to the chip select circuitry associated with processor 90. The number 26 pin of adapter 110 is connected to the Vcc voltage, while the number 7 pin is connected to ground. The 1 through 7 pins of counter 112 are connected to the 3, 2, 1, 40, 39, 38 and 37 pins respectively of adapter 110. The number 15 pin of counter 112 is connected to the number 4 pin of adapter 110, while the number 15 pin of counter 111 is connected to the number 18 pin of adapter 110. The number 1 through 7 pins of counter 111 are connected to the 19 through 25 pins respectively of adapter 110. The number 13 and 16 pins of adapter 110 are connected to the Q output of latch 116. The number 10 pin of adapter 110 is connected to the reset inputs of latches 115 and 116 and to the input of inverter 120. The number 16 pins of counters 111 and 112 are connected to the Vcc voltage while their number 8 and 14 pins are connected to ground. Their number 10 pins are each connected to the Q output of latch 116, their number 11 pins to the output of inverter 119, and their number 13 pins to the Q output of latch 115. The number 12 pin of counter 112 is also connected to the Q output of latch 115 while the number 12 pin of counter 111 is connected to the number 9 pin of counter 112. The CX output of latch 115 is connected to its R/C input through capacitor 124, while the CX output of latch 116 is connected to its R/C input through capacitor 123. The R/C input of latch 115 is also connected to the Vcc voltage through resistor 125 while the R/C input of latch 116 is also connected to Vcc through resistor 122. The B inputs of latches 115 and 116 are connected to the Vcc voltage. The A input of latch 115 is connected to the Q7 output (number 3 pin) of counter 117 while the A input of latch 116 is connected to the Q output of latch 115. The number 14 pin of counter 117 is connected to Vcc while its number 7 pin is grounded. The clock input (number 1 pin) of counter 117 is connected to the processor timer function, TMROUT0. The reset input of counter 117 is connected to the output of inverter 120. The input of inverter 119 is connected to the number 5 pin of optoisolator 54, which provides the Status Signal In signal shown in FIG. 4.

The status signal interface operates as follows: After processor 90, as described above in reference to FIG. 7, sends a command to a probe asking for its status, it waits a time long enough for the command to go out along the probe communication network and the probe that was addressed to report the status requested. It then addresses the parallel interface adapter 110 causing it to strobe the reset inputs of the counter 117 and latches 115 and 116. This causes the latches to turn on the counters 111 and 112 to begin reading the frequency coming in on the +SI input terminal and counter 117 to begin clocking a time period over which the frequency will be read. The time is controlled by the processor via the TMROUT0 function. If the processor is asking for a status that requires a high resolution reading of the SI signal coming in, it will put allow frequency signal as TIMROUT0, and if it is asking for a status that requires a low resolution reading, it will put a higher frequency signal as TMROUT0. The counter 117 will then count for a predetermined number of counts which define length of time period over which the SI signal will be read. When counter 117 times out, it activates the one-shots 115 and 116 which shut down the counters 111 and 112. The processor then tells the parallel interface adapter 110 to read the count of counters 111 and 112, which are connected to operate as a single 16 bit connector, which the adapter does and reports the count read back to the processor 90. It then signals the processor it is finished via the INT2 signal output on pin 17.

The count of counters 111 and 112 which is reported to the processor 90 is a digital signal related to the frequency of the voltage controlled oscillator 135, 147 in the probe in which the fluid status was sensed. The microprocessor uses the TMROUT0 frequency to determine an absolute value of the oscillator frequency. For example the inverse of the TMROUT0 frequency is proportional to the period over which the voltage controlled oscillator frequency was read. If he count of counters 111 and 112 is multiplied by the inverse of TMROUT0, a number is obtained which is proportional to the average oscillation frequency of the VCO, or average of the status signal, over the period. If the lower TMROUT0 frequency is output by the processor, then the period will be longer and the number of oscillations averaged over will be greater and the resolution of the status signal will be higher. The processor 90 utilizes the digital status signal to provide an indication of the sensed condition as will be discussed below.

In the preferred embodiment, parallel interface adapter 110 is a type 82655A, counters 111 and 112 are each type 74HC590 eight-bit counters, latches 115 and 116 are type 74HC221, counter 117 is a 74HC4020, inverters 119 and 120 are 74HC14's, resistors 122 and 125 are each 2K ohms and capacitor 123 and 124 are each 1000 picofarads.

The flow meters 21A in pumps 21 are conventional digital meters as are commonly used in service stations. Such meters are designed to communicate via a conventional RS-232 interface 98 which is well-known in the art.

Turning now to the description of an exemplary sensor module, FIG. 9 shows a block circuit diagram of a liquid level sensor module, such as 25C. This module includes a liquid level sensor 130, a water sensor 131, temperature sensors 132, multiplexer 134, and voltage to frequency converter 135. Each of the sensors 130, 131, and 132 apply voltage signals to multiplexer 134. The data input lines 148 from terminal block 87 are also connected to multiplexer 134. Responding to the data signals on lines 148 which originated in the controller 40, the multiplexer places on converter 135 the voltage corresponding to the status requested by the controller. Converter 135 converts the voltage to a frequency signal which is the status signal, and outputs the status signal to the local probe status terminal of terminal block 87. This signal comprises an internal liquid signal.

FIG. 10 shows a block electrical circuit diagram of another exemplary sensor module, a sensor intended to be placed in a well, such as 36 (FIG. 1), and which differentiates between water, hydrocarbon and air. This module includes a water/hydrocarbon sensor 140, a liquid/gas sensor 141, logic circuit 142, analog switch 143, voltage divider 144, multiplexer 134, and voltage to frequency converter 147. The sensors 140 and 141 each apply voltage signals to logic circuit 142 which determines if hydrocarbon, water or air is present and applies a signal indicative of which is present to analog switch 143. Voltage divider 144 employing a reference voltage level from converter 147, generates three analog voltage levels which are applied to switch 143. Switch 143 applies one of the voltage levels, which is determined by the input from logic circuit 142, to multiplexer 134. The data signal from controller 40 is applied to multiplexer 134 via data input lines 148. Converter 147 also applies a temperature signal indicative of the temperature of the IC chip to multiplexer 134. In response to the data command from controller 40 and using a reference voltage from voltage to frequency converter 147, multiplexer 134 places one of the voltages provided by the divider 144 or the temperature signal voltage to converter 147 which converts it to a frequency signal and applies this signal to the local probe status terminal of terminal block 87. This signal comprises an external liquid signal.

Figure 11:
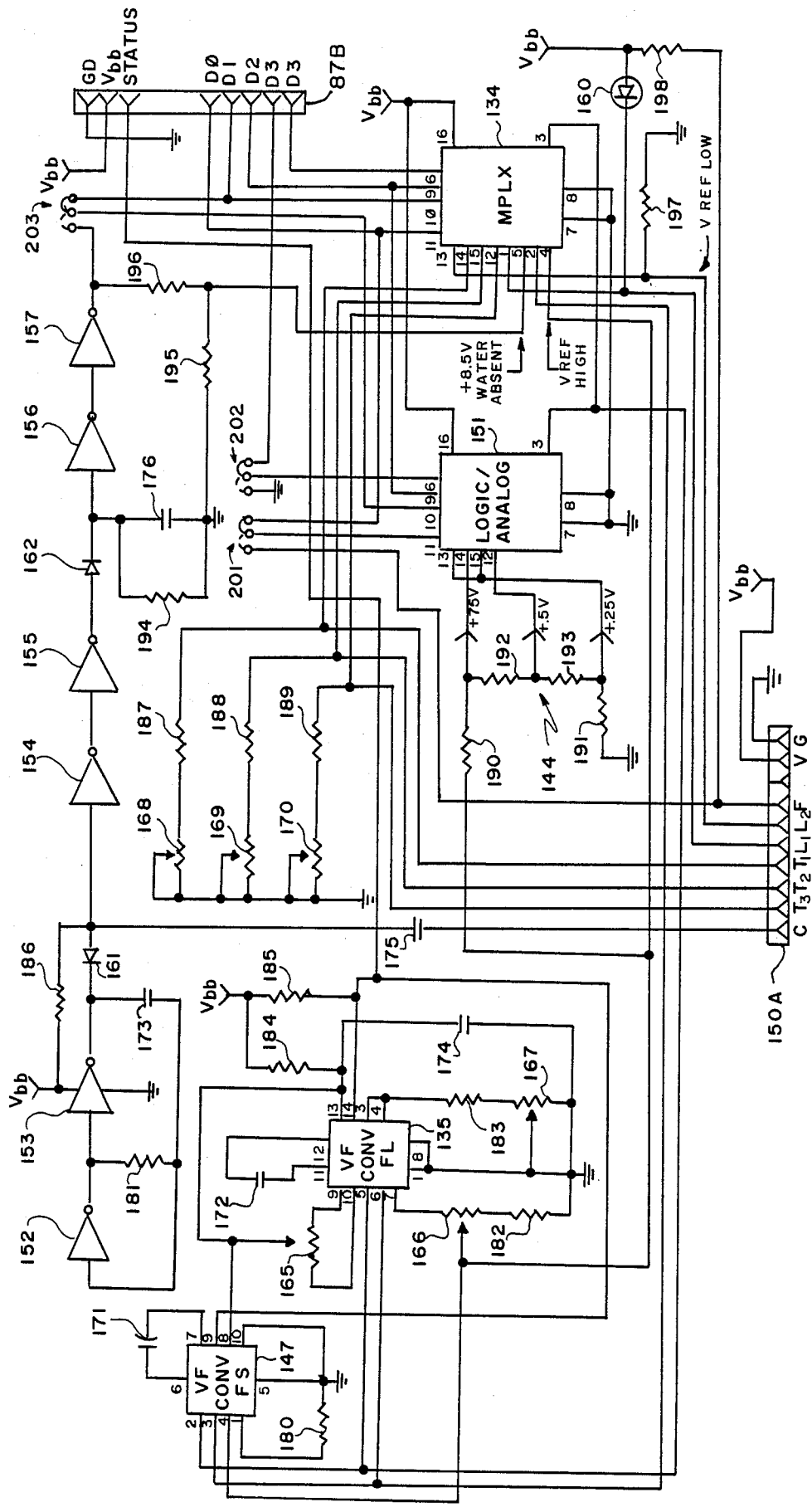
FIG. 11 is a detailed electrical circuit diagram of an exemplary preferred sensor module circuit board.

In the preferred embodiment of the invention, the liquid level sensor module of FIG. 9 and the liquid sensor module of FIG. 10 are implemented on a single circuit board which is shown in FIG. 11. Different circuits are connected on the board and different components are connected to the board via terminal block connector 150A to provide the two different sensor modules. The components that are connected to terminal block 150A to form the liquid level sensor of FIG. 9 are shown in FIG. 12, while the components that are connected to the terminal block 150A to form the liquid sensor module of FIG. 10 are shown in FIG. 13.

Figure 12:
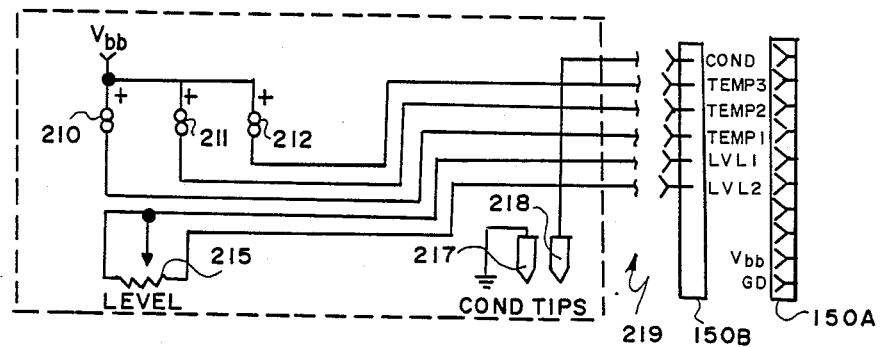
FIG. 12 shows the sensor elements which are connected to the circuit board of FIG. 11 to form the sensor module of FIG. 9.

Referring to FIG. 12, in the preferred embodiment the sensor for the liquid level module comprises temperature sensors 210, 211, 212, liquid level sensor 215, conducting electrode tips 217 and 218 and connector 150B. The temperature sensors 210, 211 and 213 are preferably located at different depths of tank 39C, the level sensor is mounted vertically in the tank, and the conducting tips 217 and 218 are located at or near the bottom of the tank. The wires 219 connect the sensor and the connector 150B which plugs into converter 150A in the probe sensor module circuit board located at the top of probe sensor module 25C.

Figure 13:
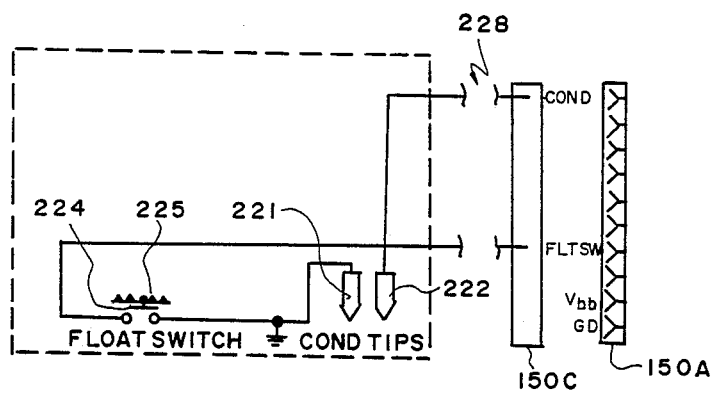
FIG. 13 shows the sensor elements which are connected to the circuit board of FIG. 11 to form the sensor module of FIG. 10.
Figure 14:
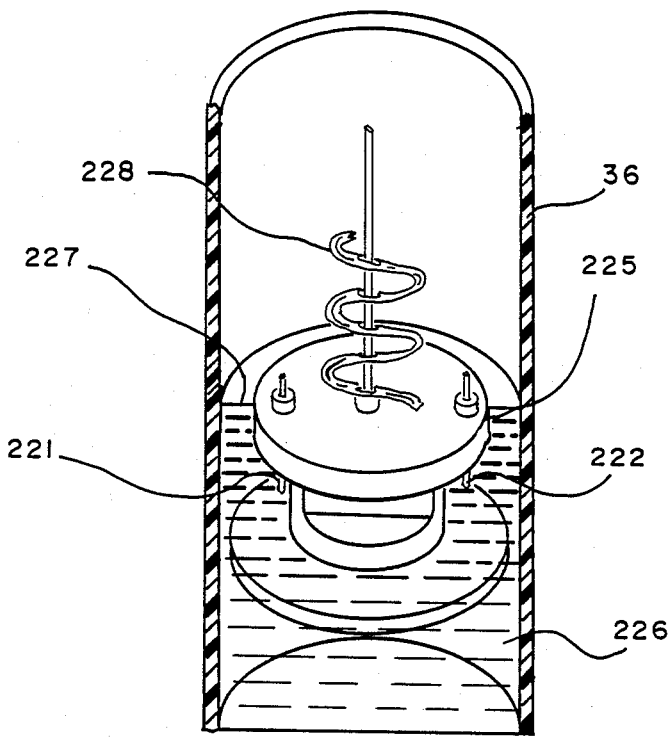
FIG. 14 shows an exemplary well and float for detecting minute quantities of leaking liquid.

Referring to FIGS. 13 and 14 the liquid sensor module sensors include conducting electrode tips 221 and 222 mounted on a float 225 which is located in a well, such as 36, external to the tanks 39A, 39B and 39C. The wells, such as 36, are located and the fill is placed around them so that any liquid leaking from a tank will seep into the well. The float 225 is free to move up and down the well as the liquid level in the well rises and falls, and the conducting tips 221 and 222 are mounted on the float so that they extend into the upper portion of the liquid 226. A float switch 224 is mounted in the float and the switch and conducting tips 221 and 222 are connected by wires 228 to connector 150C which plugs into connector 150A mounted in the circuit board located near the top of the well. The float 225 is designed so that most of the volume of the well at the level of the liquid surface 227 is occupied by the body of the float. Thus, especially if ground water is present, a very small amount of hydrocarbon (or other liquid that floats on water), for example a cup or so, will be sufficient to activate the leak probe.

Figure 15:
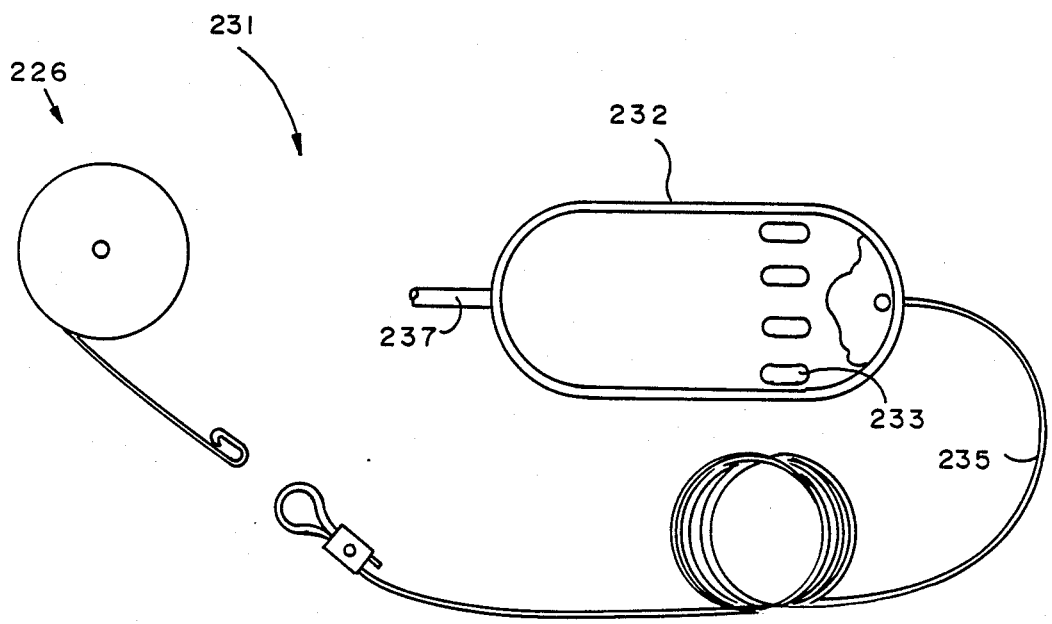
FIG. 15 shows an exemplary vapor detection sensor and the means for locating it between the walls of a double-walled tank.

A vapor sensor type leak probe 26 is shown in FIG. 16 being installed in a double-walled tank. In this probe the sensor module 26C includes a sensor unit 232 which is placed between the walls 233, 234 of the double-walled tank and electronics in a probe cap 245. Sensor unit 232 is shown in FIG. 15 together with means 231 for inserting the sensor unit between the walls of a double-walled tank. The sensor unit 232 contains the vapor sensor element, the unit having openings 233 for vapor to reach the sensor element. A cable 235 and a fish 226 provide a means 231 to install the sensor unit 232 between the walls 243, 244 of a double-walled tank. An electrical cable 237 connects the sensor unit 232 to the rest of the sensor module 230 and the probe communication module 239 which are contained in the cap 245 which closes the port 240 through which the sensor is inserted. Vapor probes 26 installed as shown have been found to be able to sense small leaks, involving less than a cupful of hydrocarbon, between the walls of a double-walled tank. The signal provided by vapor probe 26 is an external liquid signal.

A detailed electrical circuit diagram of the preferred sensor module circuit board is shown in FIG. 11. The circuit includes multiplexer 134, logic/analog switch 1.C. 151 which functions both as logic circuit 142 and analog switch 143, voltage to frequency converter 135, voltage to frequency converter 147, inverters 152 through 157, constant current diode 160, diodes 161 and 162, potentiometers 165 through 170, capacitors 171 through 176, resistors 180 through 198, jumpers 201, 202, 203, and connectors 87B and 150A. The GD or ground pin of connector 87B connects to the board system ground while the Vbb pin connects to the system voltage line. The status pin connects to the number 9 pin of converter 147, the number 14 pin of converter 135 and the Vbb voltage through resistor 185. The DO data input of connector 87B connects to the number 11 pin of multiplexer 134 and the number 11 pin of logic/switch 151 through jumper 201. Note that the solid line on jumpers 201, 202 and 203 indicates the connection for the level sensor module of FIG. 9, while the dotted line indicates the connection for the liquid sensor module of FIG. 10. Logic/switch 151 and converter 147 are not required for the level sensor module of FIG. 9 and may be omitted in the boards for the module, while converter 135 is not required for the fluid sensor module of FIG. 10 and may be omitted in boards intended for that module. Data input D1 is connected to pin 10 of multiplexer 134 and to pin 10 of logic/switch 151 through jumper 203. Data input D2 is connected to pins 9 of multiplexer 134 and logic/switch 151. Data input D3 is connected to the number 6 pin of logic/switch 151 through jumper 202, while data input D3 is connected to pin 6 of multiplexer 134. The conducting tip input pin C of connector 150A is connected to the input of inverter 154 and the anode of diode 161 through capacitor 175; the input of inverter 154 is also connected to the Vbb voltage through resistor 186. Inverters 152, etc. are a hex inverter chip, the voltage input of which is connected to the Vbb voltage and the ground of which is grounded. The output of inverter 153 is connected to the input of inverter 152 through capacitor 173, while the output of inverter 152 is connected to the input of inverter 153 and also is connected to its own input through resistor 181. The output of inverter 153 is connected to the cathode of diode 161 and the anode of the diode is connected to the input of inverter 154. The output of inverter 154 is connected to the input of inverter 155, and the output of inverter 155 is connected to the anode of diode 162. The cathode of diode 162 is connected to the input of inverter 156, to ground through capacitor 176, and also to ground through resistor 194. The output of inverter 156 is connected to the input of inverter 157. The output of inverter 157 is connected to the number 5 pin of multiplexer 134 through resistor 196, and the same pin is also connected to ground through resistor 195. The output of inverter 157 is also connected to pin 10 of logic/switch 151 through jumper 203 in the liquid sensor module embodiment. One side and the adjustable contact of each of potentiometer 168, 169 and 170 is connected to ground while the other side is connected to pins 14, 15 and 12 respectively of multiplexer 134 through resistors 187, 188 and 189 respectively; pins 14, 15 and 12 are also connected to the numbers 1, 2, and 3 temperature inputs (T1, T2 and T3) of connector 150A. The level 1 input, L1, of connector 150A is connected to the number 1 pin of multiplexer 134 and to the Vbb voltage through constant current diode 160, with the cathode of the diode toward the level 1 input. The level 2, L2, input of connector 150A is connected to the number 13 pin of multiplexer 134 and also to ground through resistor 197. The float switch input, F, of connector 150A is connected to the number 11 pin of logic/switch 151 through jumper 201 in the liquid sensor module embodiment, and also to the Vbb voltage source through resistor 198. The V and G pins of connector 150A are connected to the Vbb voltage and ground respectively. The number 13 and 15 pins of logic/switch 151 are connected to ground through resistor 191 and also connected to its number 12 pin through resistor 193. The number 12 pin is also connected to the number 14 pin through resistor 192; the number 14 pin is also connected to the number 4 pin of multiplexer 134, to the adjustable input of potentiometer 166, and to the number 4 pin of converter 147 through resistor 190. The number 7 and 8 pins of logic/switch 151 and multiplexer 134 are all grounded, while the number 16 pin of each are connected to the Vbb voltage. The number 3 pins of each are connected to the number 2 pin of converter 147 and the number 5 pin of converter 135. The number 2 pin of multiplexer 134 is connected to the number 6 pin of converter 135 and to the number 3 pin of converter 147. The number 1 pin of converter 147 is connected to ground through resistor 180, the number 5 and 10 pins are grounded and the number 6 pin is connected to the number seven pin through capacitor 171. The number 8 pin of converter 147 is connected to the adjustable input of potentiometer 165 and to pin 13 of converter 135. The two sides of potentiometer 165 are connected to pins 9 and 10 respectively of converter 135. Pin 13 of converter 135 is also connected to the Vbb voltage through resistor 184 and to ground through capacitor 174. Pin 11 of converter 135 is connected to pin 12 through capacitor 172. Pins 3 and 4 of converter 135 are connected to one side of potentiometer 167 through resistor 183. The other side of potentiometer 167 is connected to ground. The adjustable input of potentiometer 167 is connected to ground. Pins 1 and 8 of converter 135 are also connected to ground. Pin 7 of converter 135 is connected to one side of potentiometer 166, while the other side of the potentiometer is connected to ground through resister 182.

In the preferred embodiment of the invention multiplexer 134 and logic/analog switch 151 are type CD4051BCN multiplexers, voltage to frequency converter 147 and 135 are type AD537JH- V/F converters available from Analog Devices, inverters 152 through 157 are implemented in a single hex inverter type CD4069CN, diodes 161 and 162 are of type IN914's, constant current diode 160 is a type IN5297, potentiometer 165 is a 20K ohm, 15 turn potentiometer, 166 is a 10K ohm, 15 turn potentiometer, 167 is a 200K ohm, 15 turn potentiometer, 168, 169 and 170 are 100 ohm, 15 turn potentiometers, capacitors 172, 173, 174, 175 and 176 are 0.01 microfarad, 4700 picofarad, 10 microfarad, 0.1 microfarad and 1 microfarad respectively. Resistors 180 through 198 are 1K ohm, b 220K ohm, 60.4K ohm, 909 ohm, 100 ohm, 5K ohm, 270K ohm, 953 ohm, 953 ohm, 953 ohm, 24K ohm, 24K ohm, 24K ohm, 24K ohm, 100K ohm, 10K ohm, 90K ohm, 10 ohm, and 100K ohm respectively. In the preferred embodiment of the sensors of FIG. 12 and 13 the temperature sensors 210, 211, and 212 are type AD590 temperature sensors available from Analog Devices, level sensor 215 is preferably a Metritape TM level sensor available from, Metritape, Inc., P. O. Box 2366, Littleton, Mass. 01460, the float 225, float switch 224, and conducting electrode tips 221 of the fluid sensor of FIG. 13 are a float assembly of the type used with the FD probe series (FD241R, FD 241S, FD241P) available from Pollulert Systems, Inc., P.O. Box 706, Indianapolis, IN 46206-0706 and as described in U.S. Pat. No. 4,442,405 issued to Raymond J. Andrejasich. The conducting electrode tips 217 and 218 are electrodes as described in the foregoing patent, preferably made of stainless steel or platinum, and connectors 150A, 150B and 150C are preferably stake and header connectors while connectors 87A and 87B are preferably 1510D male and female connectors, or both connectors may be hard wired.

Turning now to a summary of the function of the liquid level sensor module of FIGS. 9, 11 and 12 in conjunction with the controller 40 and probe communication system, the liquid level sensor has the principal function of measuring the liquid level in a storage tank such as 39C. It also measures the temperature at three depths along the sensor. Water in the storage tank is detected via conductance electrodes 217 and 218 installed at the bottom of the level sensor module 25C. The liquid level is transduced into an analog signal by the Metritape TM level sensor 215 which may be described as a long variable resistor the submerged part of which is short-circuited by hydrostatic pressure of the liquid in which it is immersed. The temperature sensing is accomplished by two-terminal electronic devices 210, 211 and 212 which conduct current in direct proportion to their absolute or Kelvin temperature. Two reference voltages, V Ref High and V Ref Low, are also measured and reported by the sensor, one near the top and one near the bottom of the analog signal range, these data being necessary to enable the controller 40 to decode the telemetered data. Finally, a signal, V temp, representing the temperature of the electronics package is available for transmission to the controller 40 upon command.

Referring to FIG. 9, an eight-channel analog multiplexer 134 under command of a three-bit digital word from the controller selects one from among an ensemble of eight analog input channels 136 and connects it to the input of voltage to frequency converter 135. The output of converter 135 is a symmetric square wave whose frequency is directly proportional to the analog input voltage. This signal is well suited for transmission through the probe chain to the controller 40, where it is decoded by counting techniques and interpreted with respect to reference signals transmitted through the same chain. Two of the analog input signals to the multiplexer are auxiliary outputs of the converter 135. The signal flow is otherwise straight forward.

Referring to FIGS. 11 and 12, the liquid level sensing circuit consists of a Metritape TM variable resistor 215 excited by a constant current diode 160. The resistance of the level sensor 215, and hence the voltage across it, is proportional to the length of the sensor which is in air. The difference between the air height and the sensor overall height is taken to be the depth of liquid in the storage tank. A 10 ohm reference resister 197 is inserted between the level sensor 215 and ground. The voltage across this resistor when excited by the 1 ma constant current source is a 10 mV level called low. This is done in preference to using zero volts as a reference level to avoid requiring converter 135 to operate at the extreme of its range.

The temperature sensors 210, 211 and 212 are semiconductor devices which are two-terminal current sources that conduct a current which is proportional to the absolute or Kelvin temperature with a nominal scale factor of 1 microamp per degree Kelvin. For temperature 1, the sensor 210 is read out by converting its current into the voltage across grounded resistor 187. Variable resistor 168 is a scale factor trim which is employed as a single point calibration adjustment. The result is a scale factor of 1 millivolt/degree Kelvin. Temperatures 2 and 3 are read similarly.

The water/hydrocarbon sensor circuit consists of a multivibrator, an alternating-current conductance-sensing circuit, and a half-wave rectifier and filter circuit. A conventional CMOS free-running multivibrator is formed by inverters 152 and 153, resistor 181, and capacitor 173. A square wave at about 500 Hz is present at the output of inverter 153. When the conducting tips 217 and 218 are in air or oil, capacitor 175 is effectively not in the circuit and the square wave appears at the input of inverter 154 and the output of inverter 155. Diode 162 and capacitor 176 form a peak detector which is discharged by resister 194. When the square wave is present at the output of inverter 155, a high level is present at the input of inverter 156 and hence at the output of inverter 157. When water is present between the conducting tips 217 and 218 capacitor 175 is effectively connected to ground and the voltage at the input of inverter 154 does not have time to rise significantly from the low level to which it is set by the conduction of diode 161; that is, there is insufficient current flow through resister 186 to charge capacitor 175 during the positive half period of the multivibrator. In effect, the square wave is shorted to ground by capacitor 175 and the water conductance across the conducting tips 217 and 218. Accordingly, diode 162 does not conduct and a low level obtains at the input of inverter 156 and at the output of inverter 157, the latter of which constitutes the logic signal which indicates that water is present. The circuit output switches sharply at a conducting tip resistance of about 150K ohm. The threshold resistance can be increased by increasing the value of resister 186.

An eight channel analog multiplexer integrated circuit 134 suffices for the level sensor, though the other multiplexer 151 is available if expansion to more channels is desired. The outputs (pin 3) of the multiplexers 134 and 151 are hardwired together because a high level on the inhibit line (pin 6) of the deselected chip places all of its analog switches in the high impedance state.

The voltage to frequency converter integrated circuit 135 produces a square wave logic signal output having a frequency that is proportional to the analog input signal voltage with a nominal scale factor of 10K Hertz/volt. As used in this circuit, the input impedance seen by the analog input source is about 250 megohms, with an input bias current of 100 na. Therefore, errors due to loading and input current are less than 0.1% and are thus negligible. In order to secure the maximum dynamic range of which the converter 135 is capable, it is necessary to null the input amplifier. This is accomplished with potentiometer 165.

The scaling equation relating output frequency to input signal voltage in this circuit is: F out=Vin/10 (resistance 183+resistance 167)×capacitance 172. Potentiometer 167 is used to adjust the scale factor. The V/F converter 135 provides the voltage reference output on pin 7 which is specified as 1 volt±5%. Potentiometer 166 is used to create a precise 900 mV±1 mV reference called Vref high, which is connected to the multiplexer 134 at pin 4.

Another output signal from the converter 135 is a thermometer output representing the chip absolute temperature with a scale factor of 1 mV/° K±2%. The initial calibration is specified as raiseline accurate within ±5 Kelvin degrees at room temperature. This reference output is connected to the multiplexer 134 at pin 2 and is used to indicate the temperature of the sensor module electronics package. This temperature may be used by processor 90 in a conventional fashion to correct the received converter frequency as indicated in the manufacturer's specifications provided with the VCO chip. Such correction is not necessary if the voltage levels provided to the voltage controlled oscillator are spaced more widely than the changes in frequency due to temperature and/or if the probe circuit temperature is relatively stable.

Turning now to a summary of the function of the liquid sensor module of FIGS. 10, 11, 13 and 14, in conjunction with the controller 40 and the probe communication system; the purpose of the liquid sensor module 149 is to detect the presence of liquid and determine whether the liquid is hydrocarbon or water. A float switch 224 detects that liquid is present; an electrical conductance circuit 140 discriminates between hydrocarbon and water. These two inputs to a logic circuit 142 determine which of three analog levels is presented to voltage-to-frequency-converter 147. The resulting one of three frequencies is transmitted through the probe chain to the controller 40 to be decoded by a counting technique. Referring to the block diagram in FIG. 10, a water/hydrocarbon sensor 140 gives a logic signal which is high when electrical resistivity between conducting tips 221 and 222 is above a threshold value (about 150K ohm) and low when the resistivity is below the threshold. Thus a low output signifies that water is present between the tips. The float switch 224 generates a logic signal signifying that flotation has occurred. A logic circuit processes these two inputs and controls an analog switch 143 to connect one of three analog levels generated by voltage divider 144 to multiplexer 134. Input signals from the controller 40 control the analog channel selected by the multiplexer 134. In the liquid sensor 149, four multiplexer channels 146 are utilized; they are: air-oil-water signal, reference voltage (nominal 1 volt); zero volt reference; and thermometer output signal. Converter 147 generates a symmetric square wave of a frequency which is directly proportional to the analog voltage output of multiplexer 134. This square wave signal is suitable for transmission thru the Communication module chain to the processor in the controller 40. The proportionality constant is nominally 10K Hertz/volt. Two analog output signals are also generated by the converter 147: a one-volt reference level which is used to drive voltage divider 144; a thermometer signal which is directly proportional to the absolute (Kelvin) temperature of the converter integrated circuit chip 147, and which has a proportionality constant of 1 millivolt/degree Kelvin. The latter signal is used to monitor the temperature of the fluid sensor electronics package. Referring to FIG. 11, because of commonality of function, both the liquid sensor 149 and the level sensor 139 are constructed on the same printed circuit board by suitable inclusion or omission of components and suitable placement of three jumper connections 201, 202 and 203. The curved dashed lines on the schematic diagram indicate the required jumper connections for the liquid sensor 149; the solid curved lines are the jumpers for the level sensor 139. The water/hydrocarbon sensor circuit 140 operates as described above in the discussion of the level sensor 139 to produce a logic signal at the output of inverter 157 which is applied to pin 10 of logic/switch 151 in the liquid sensor embodiment.

The float switch 224 is a magnetically actuated single-pole single-throw switch which is connected to the grounded electrode tip 221 in the float assembly 225 when no liquid is present. Flotation causes the float switch 224 to open. The switch is connected to Vbb through resister 198 and, via the dashed jumper 201, to pin 11 of logic/switch 151, a channel select input. Hence flotation causes a high level at pin 11. The output of the water/hydrocarbon sensor circuit connects via dashed jumper 202 to pin 10, another channel select input of logic/switch 151. Pin 9 of logic/switch 151 is held low by software commands from the controller 40. Integrated circuit logic/switch 151 is a multiplexer chip which is used in the fluid sensor both as logic circuit 142 and as multipole analog switch 143. Its channel select inputs are exploited for their ability to do simple logic on two binary input signals and express the result by selecting one from the ensemble of analog input signals connected to the channel inputs. The voltage divider circuit 144 provides voltage levels of 0.75, 0.5 and 0.25 volts to pins 12, 13, 14 and 15 respectively of logic/switch 151. The logic is such as to produce the relationship codified in Table 1 between conditions and analog voltages at the output, pin 3, of logic/switch 1.

TABLE 1

| Condition | Logic Input pin 11 | Logic Input pin 10 | Analog Switch Output pin 3 | Frequency of VF Converter Output pin 9 |
|---|---|---|---|---|
| Air | Low | High | .25 Volt | 2048 Hz |
| Oil | High | High | .5 | 4096 Hz |
| Water | High | Low | .75 | 6144 Hz |

The output of pin 3 is applied as the analog input signal to voltage to frequency converter 147, pin 2. Output frequencies as shown in Table 1 are produced in response to the detected conditions. Note that the output pins 3 of the two multiplexer chips 151 and 134 are hardwired together; this is feasible because the inhibit input, pin 6, is under software control. When the inhibit input is high all analog switches go to the high impedance state. Converter 147 also provides a reference voltage of 1.0 volt on its pin 4 which is used to drive the voltage divider 144 and is connected to multiplexer 134, pin 4, so that it may be monitored by the controller 40. Converter 147 also produces a thermometer output signal on its pin 3 which is an analog signal proportional to the absolute or Kelvin temperature of the V/F chip with a scale factor of 1 mV/° K. This signal also connects to multiplexer 134 at pin 2. The scale factor of the converter 147 is set by capacitor 171 and resistor 180 according to the relation: F = V/10 × resistance 180 × capacitance 171, with the values shown, the s scale factor is 10 KHz/volt. Note that capacitor 171 should be mounted close to the pins to which it connects to avoid errors due to pickup and stray capacitance.

The above description of the sensor module for the liquid level probe and the liquid probe is exemplary. From the description it should e clear that any sensing element that has an output signal in the form of a voltage can be incorporated into such a probe by adjusting it to an appropriate voltage level, gating the voltage with a multiplexer or similar gate, applying the voltage to a voltage to frequency converter, and applying the resulting output of the converter to a communication module as described above. In the preferred embodiment such a circuit is provided for the vapor probe 26 and the line pressure probe 23. The vapor probe electronics to produce the above-mentioned voltage level is preferably as described in U.S. patent application Ser. No. 098,561 while the mechanical packaging and method for installing it between the walls of a double-walled tank is as described in U.S. Pat. No. 4,779,450. The line pressure sensor 23C is preferably a sensor incorporating an electronic circuit as described in U.S. patent application Ser. No. 07/134,694 to produce two voltages, one indicating a trip point at about 3 psi and another indicating a trip point of about 7 psi. These voltages are presented to a logic circuit and analogue switch similar to those shown in FIG. 10 to provide the signals to the multiplexer (such as 134) which are passed on to the controller. These signals from the line pressure probe 23 also comprise an internal liquid signal.

Turning now to FIG. 17, a block diagram of the flow unit 22 is shown. The unit comprises flow meter 22A, overflow gauge 22C, flow meter interface 250, overflow interface 252, microprocessor 255 and RS232 port 257. The flow meter is preferably a high accuracy turbine flow meter such as a Cox model No. F-¾ manufactured by the Schutte and Koerting Division of Ametek, Inc., 3255 W. Stetson Avenue, Hemet, Calif. 92343 although other conventional flow meters may be used. Overflow gauge 22C is preferably a model No. 73 made by Magnetrol International, 4300 Belmont Road, Downers Grove, Ill. 60515. although other conventional overflow gauges may be used. The output of the preferred flow meter 22A is a series of pulses of a frequency which is proportional to the flow rate through the flow meter. Thus, the signal received by flow meter interface 250 is similar to that received by status signal interface 96 and can be handled similarly. In this case however, the reset strobe is preferably initiated either by a keyboard command communicated via cable 32, port 257, and microprocessor 255 prior to delivery. The output of overflow gauge 22C is a voltage signal of a predetermined voltage level, and, therefore, interface 252 is a simple voltage bridge which adjusts the input voltage to a suitable level for input to microprocessor 255. Microprocessor 255 is preferably a type HD63701V0P or HD6301V1, both of which are made by Hitachi, although many other microprocessors could be used. Its primary function is to store the output of the flow meter 22A between interruptions from the controller 40; preferably it also performs averaging and corrections that would otherwise have to be done by controller processor 90, thus saving controller time for monitoring functions. RS232 port 257 communicates between microprocessor 255 and the controller RS232 interface 97. The signal from flow unit 22 also comprises an internal liquid signal.

Figure 19:
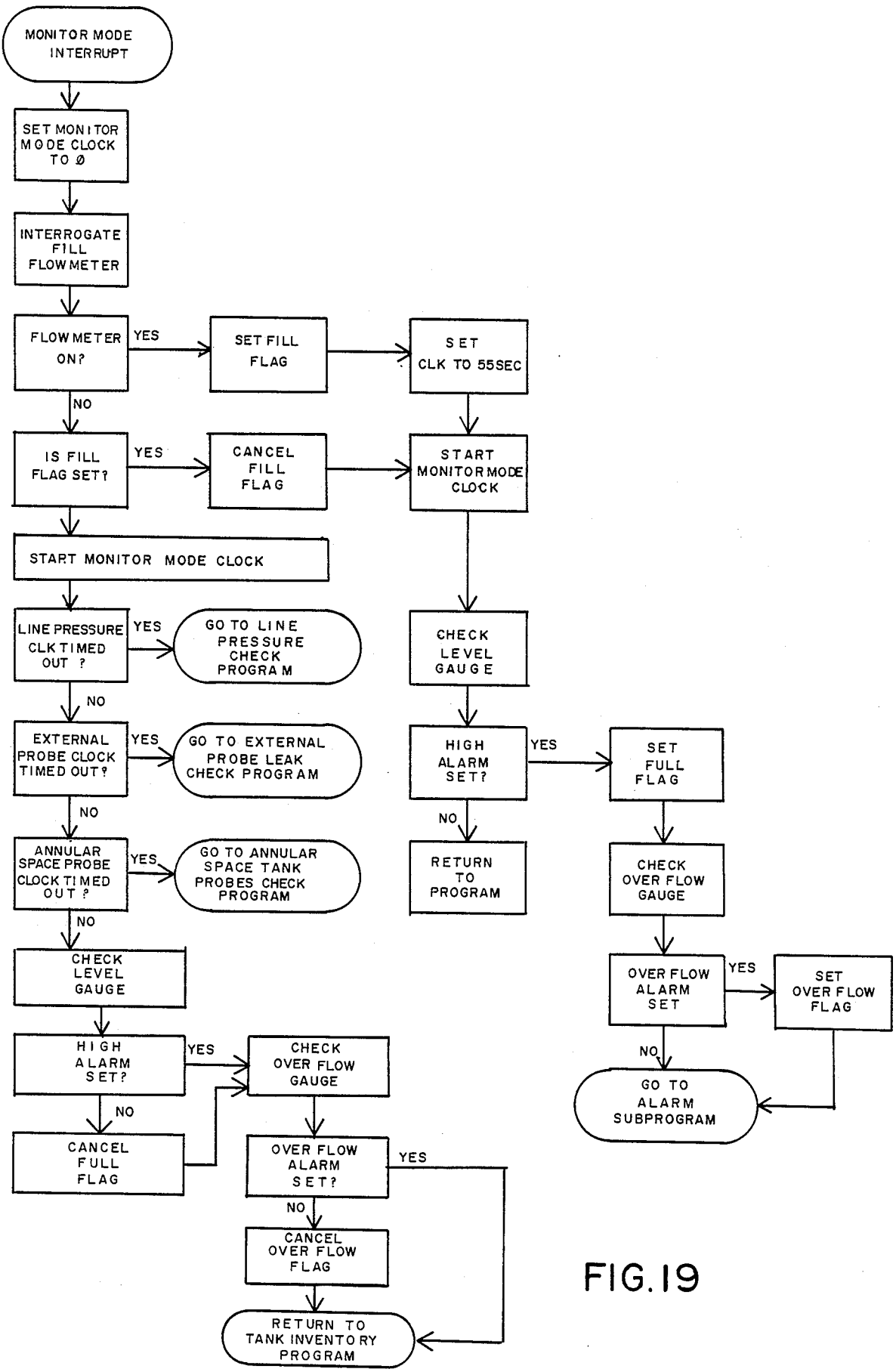
FIG. 19 is a flow chart showing the preferred Monitor Mode sub-program.
Figure 20:
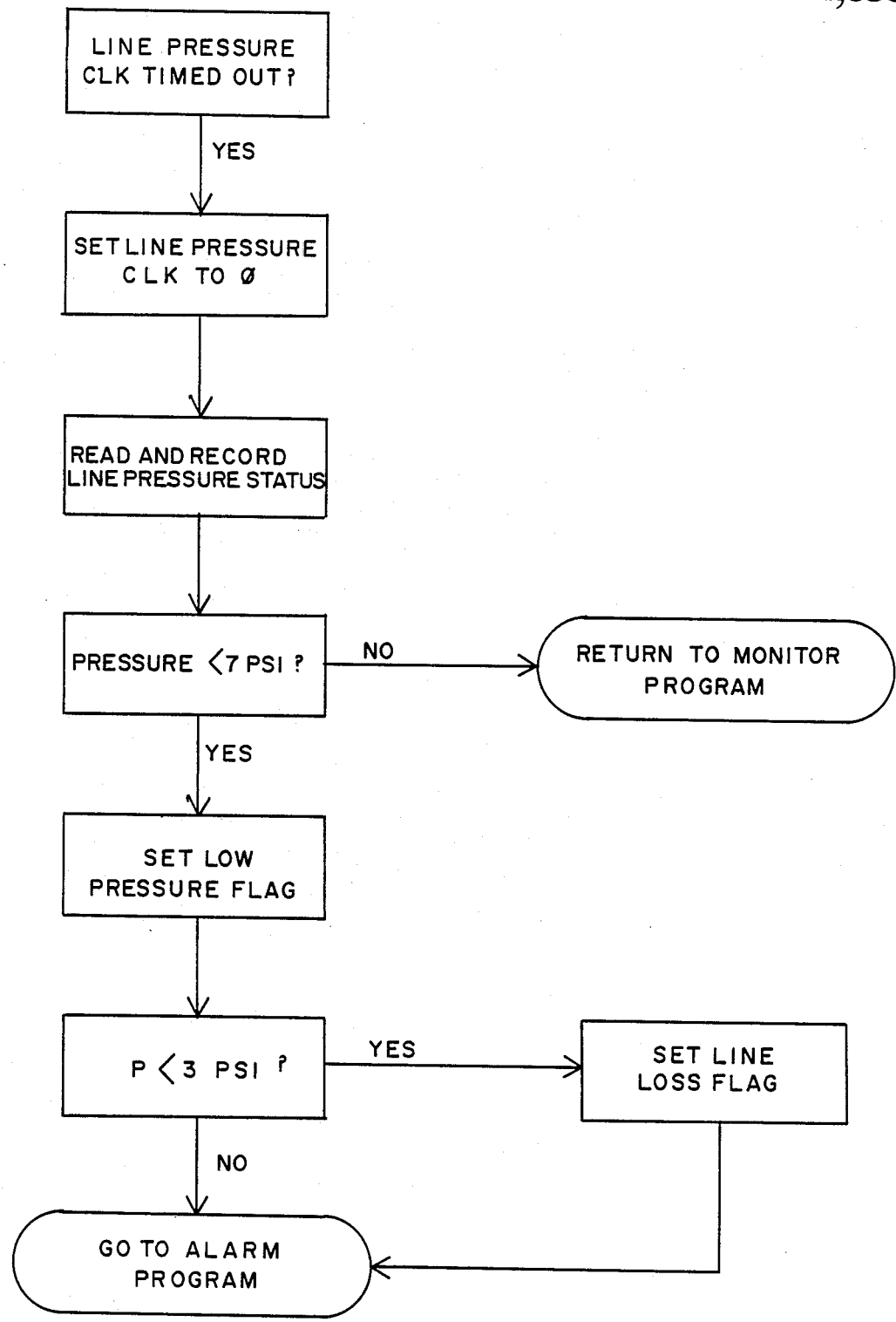
FIG. 20 is a flow chart showing the preferred line pressure probe check sub-program.
Figure 21:
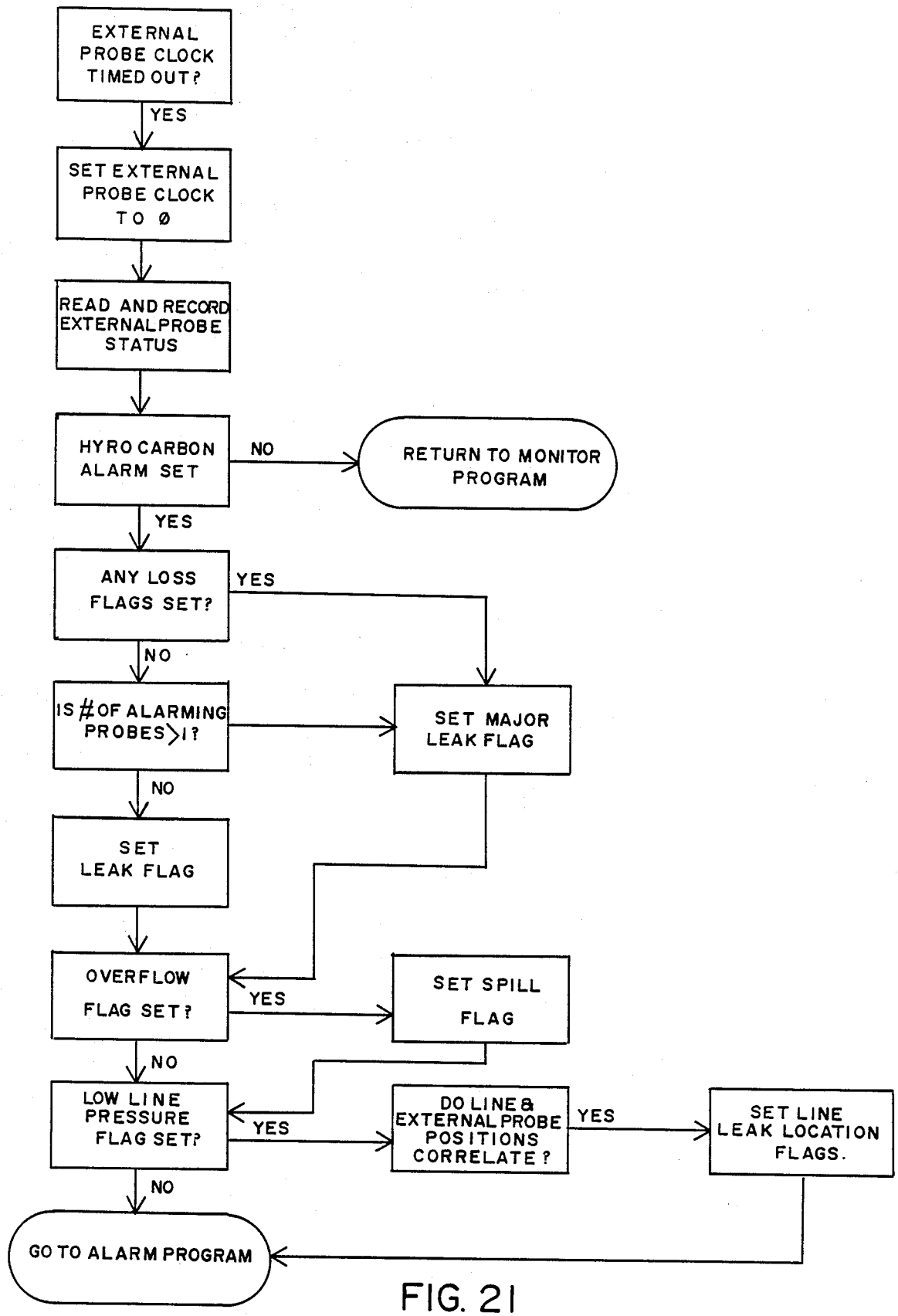
FIG. 21 is a flow chart showing the preferred external probe check sub-program.
Figure 22:
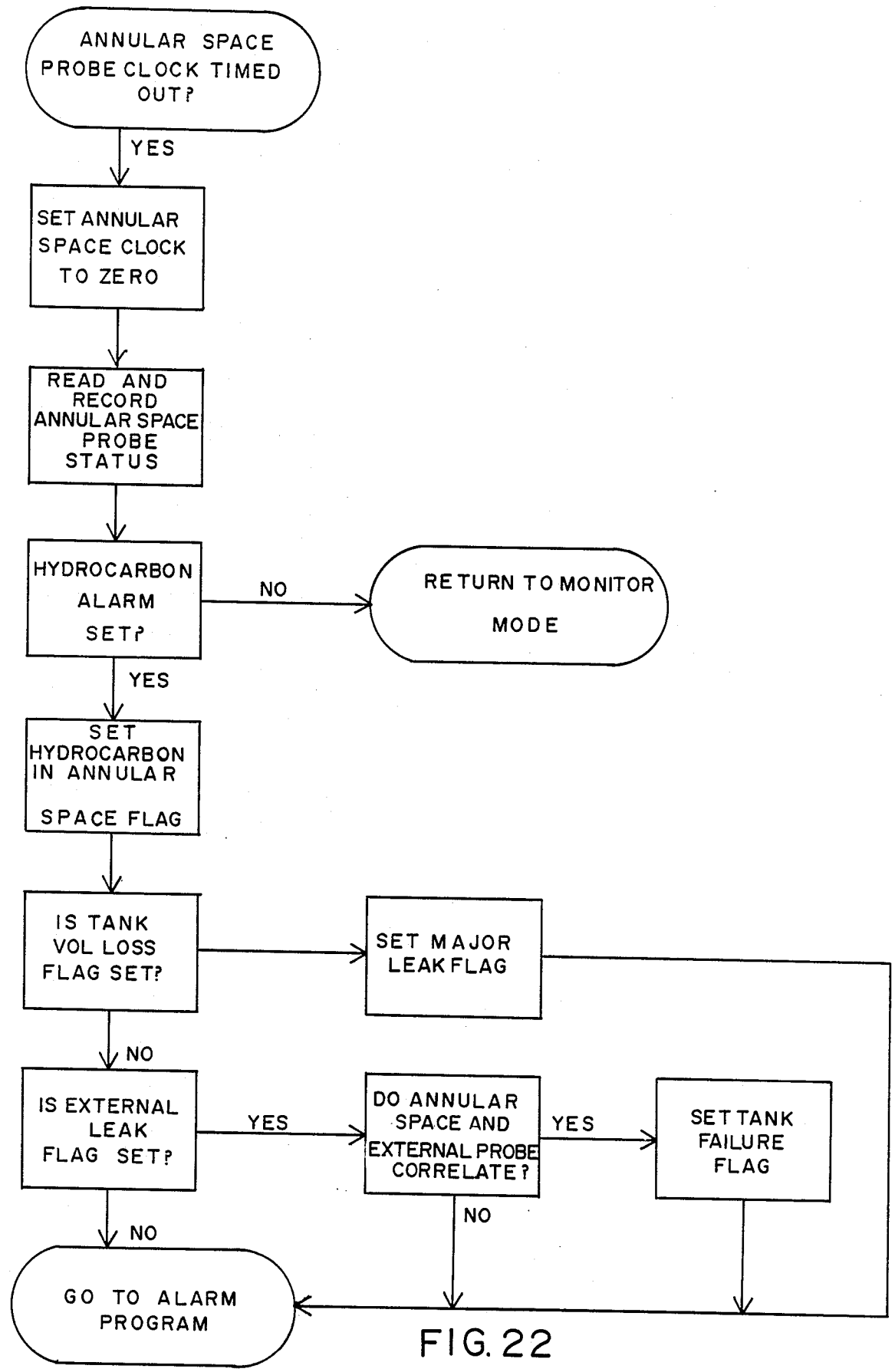
FIG. 22 is a flow chart showing the preferred annular space probe check sub-program.

Turning now to FIGS. 17 and 19 through 23, the flow charts of the preferred controller processor programs are shown. The main program is summarized in FIG. 17. The program initializes the system and performs maintenance routines after it is turned on. These initializations and maintenance routines are conventional and will not be discussed herein. These routines preferably contain a timing interrupt as described, for example, in U.S. Pat. No. 4,736,193. Whenever a specified key on keyboard 51 is hit, such as the exit key, the software enters the program mode in which the system may be programmed. Such a program mode is described in the above patent application, and may be modified as necessary to carry out any desirable programming of the system. The main program is interrogated approximately once each minute and enters the monitor mode which is shown in FIG. 19. In the monitor mode, the flow unit 22 is interrupted to see if the flow meter is running. If it is, the program enters a fill mode subroutine which checks the level gauge every five seconds. When the high alarm of the level gauge indicates that the tank is approaching full, the system enters a tank full mode and checks the overflow gauge then goes into alarm mode in which appropriate visual and audio signals of the approaching full condition are provided. The system will continue checking the overflow gauge at five second intervals until the flow meter shuts off. Thereafter the system will recommence checking the overflow gauge 22C each time the flow meter turns on, until the tank liquid level falls below the high level alarm of the level gauge and deactivates the high level alarm. When the flow meter turns off, the system checks the level gauge and overflow gauge one more time then progresses to monitor the line pressure probes, the external probes, and the annular space probes. The preferred programs for these monitoring functions are shown in FIGS. 20, 21 and 22 respectively.

As discussed above, the preferred line pressure probe 23 returns a signal that differentiates between three pressure levels, i.e. less then about 3 psi, between 3 psi and 7 psi, and above 7 psi. The program sets a low line pressure flag whenever the line pressure drops below 7 psi and a line leak flag whenever the line pressure drops below 3 psi. These flags are utilized in the alarm program to provide alarms and also provide additional decision criteria which are incorporated into the external probe and tank inventory mode subroutines. The line pressure subroutine is called each time the line pressure clock times out. The clock is a programmable software clock which is preferably set to about 2 minutes.

The external probe subroutine is shown in FIG. 21. This subroutine is called each time the external probe clock times out; this software clock is also preferably set to about time out at about 2 minute intervals. This subroutine utilizes the stored decision criteria provided by data input by various probes and sensors and by other subroutines (in the form of flags) to provide a more reliable and more detailed response to storage system leaks than could be provided by any prior art leak detection system. If there are no probes alarming the system simply records this fact and returns to the monitor mode subroutine. If one or more probes report a hydrocarbon condition, the subroutine checks to see if a loss flag has been set, i.e. whether the tank inventory subroutine (see below) has determined a tank volume loss or the line pressure subroutine has determined a line loss. If so, than a major leak flag is immediately set. The major leak flag is also set if more than one probe is reporting a hydrocarbon condition. Otherwise the leak flag is set. Next the program checks to see if an overflow flag has been set, and if so it sets the spill flag indicating that a spill (as opposed to a leak) has likely occurred. Finally the program checks if a low line pressure flag has been set, and if so the low line pressure location (assuming more than one line pressure probe in the system) are compared with the probes reporting hydrocarbon conditions and if any correlate, line leak location flags are set which are used to provide indications on printer 41 and display 42 (or via peripherals 49) showing the location of the leaks.

The annular space probe checks subroutine is shown in FIG. 22. This subroutine is called up by a programmable software clock that is preferably set to about 4 minutes. If the annular space probes, such as 26, do not report any hydrocarbon presence, the system returns to monitor mode. If a probe is reporting the hydrocarbon condition, the hydrocarbon in annular space flag is set. If there is also a tank volume loss flag set for the same tank then the major leak flag is set. If an external leak flag is set, and the leak correlates with the tank in which the annular probe is reporting hydrocarbon, then a tank failure flag is set indicating that both the inner and outer tanks have been penetrated.

Figure 23:
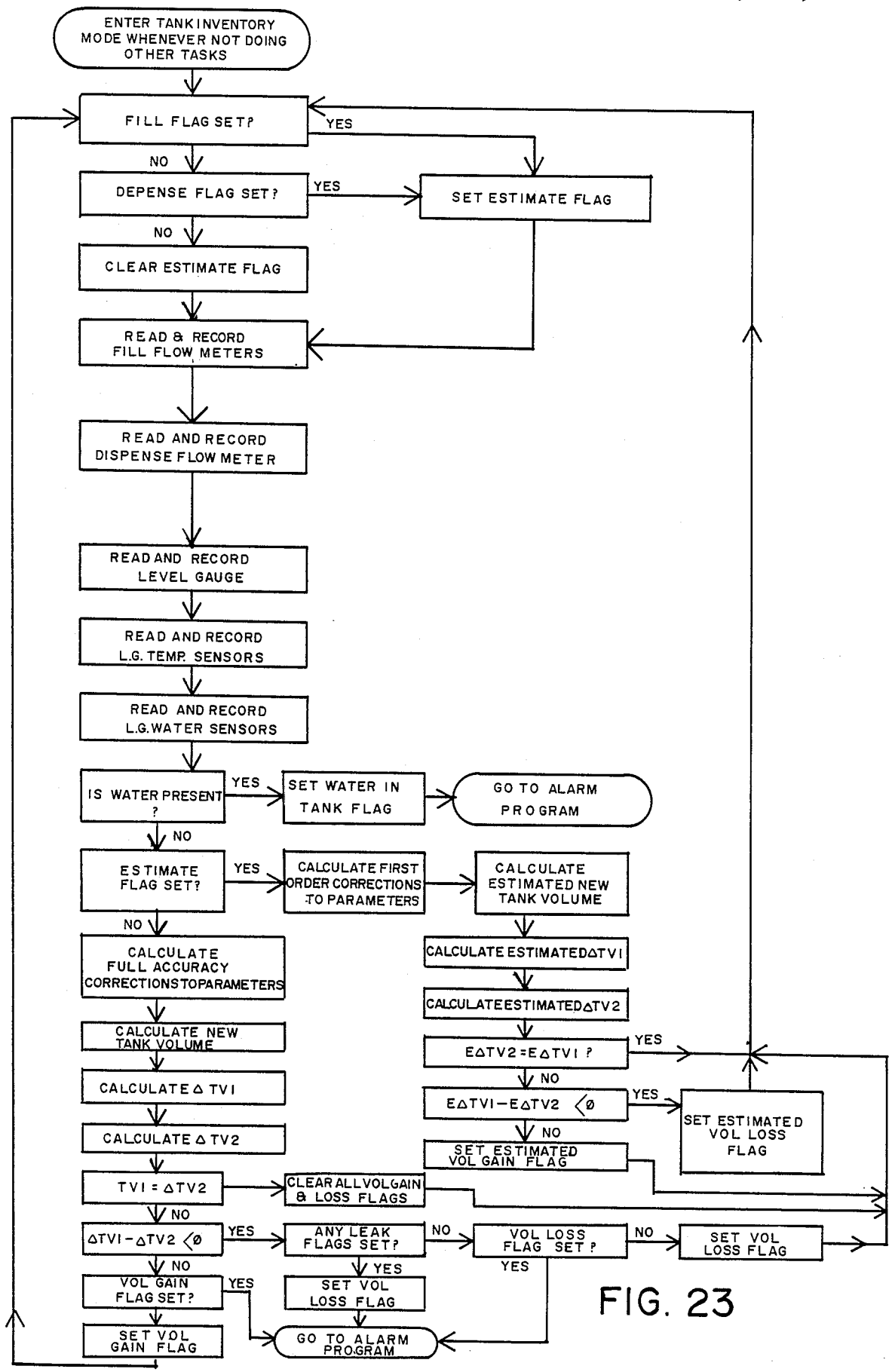
FIG. 23 is a flow chart showing the preferred tank inventory portion of the main program.

The tank inventory program which forms part of the main program is shown in FIG. 23. This program is returned to wherever the processor 40 is not performing other tasks, and continually recycles itself so long as the microprocessor is not called on to do other tasks. Generally, the full calculation to complete this program will take several minutes of processor time. If either the dispensing pumps or the fill flow meter are operating, the program will read and record the necessary data then deviate to a short-form calculation which estimates the tank volume. If a tank volume loss is found in the estimate mode an estimated volume loss flag is set. This flag is sufficient to set off alarm indications when it shows up in combination with other leak or loss flags, such as in the external leak probe and annular leak probe monitoring programs, but will not of itself cause the system to go into alarm. If both the dispense and input flow meters are not operating, the system does a full accuracy calculation of the tank volume. This calculation is such that it is based on previous calculations and thus during long periods of pumps and meter shutdowns, such as overnight, very accurate inventory calculations can be made. Even in the accurate mode, the system will not sound an alarm the first time a tank volume loss or gain is calculated, unless there is a leak flag set, in which case the volume loss flag is immediately set and the system goes to the alarm program. If no leak flag is set, then the system will set the volume loss flag and go into alarm whenever two gains or two losses in a row are calculated with no intervening calculations showing no gain or loss.

Figure 24:
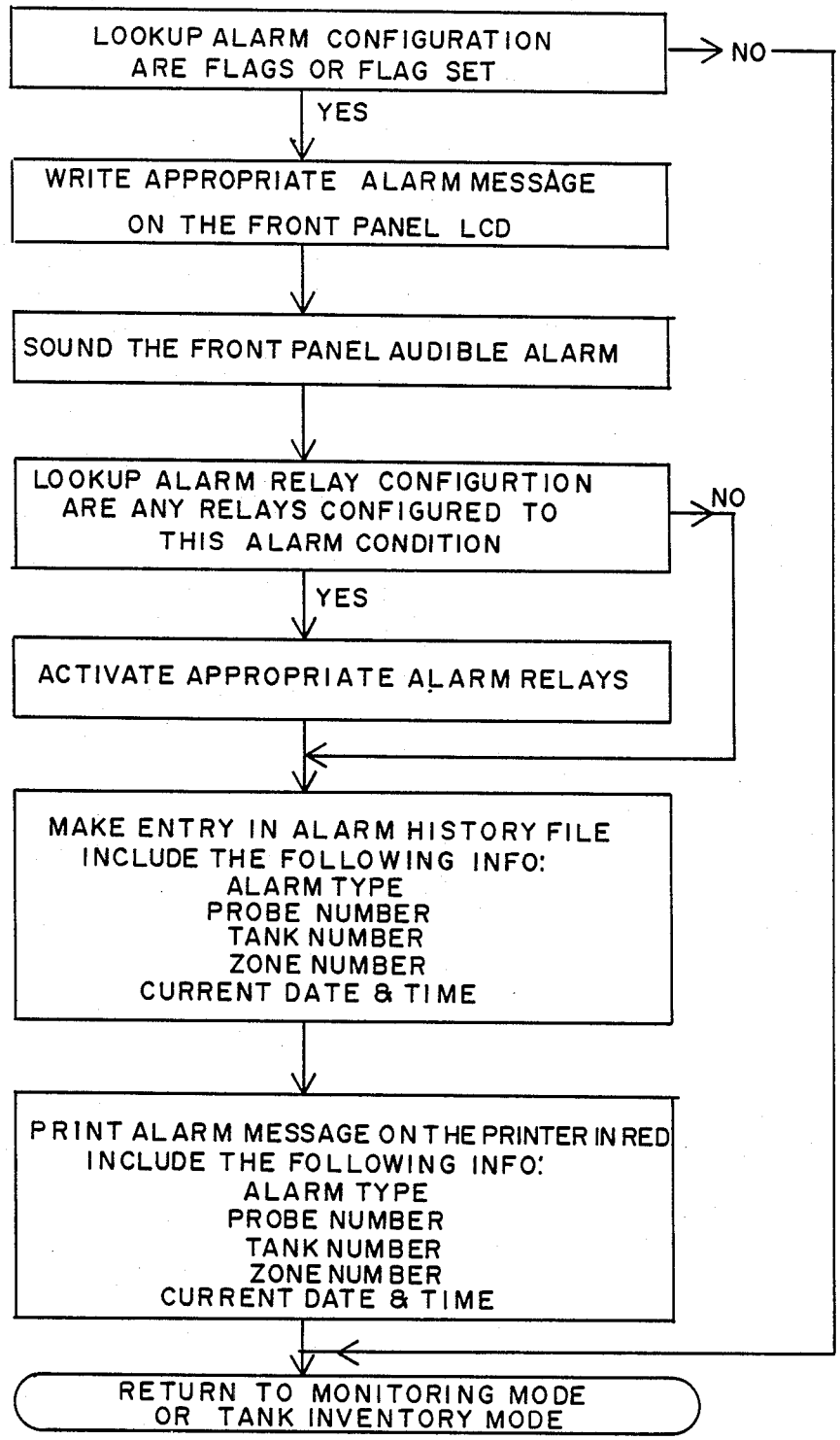
FIG. 24 is a flow chart showing the preferred alarm program.

The alarm program is shown in FIG. 24. The program provides appropriate audio and visual indications of the various alarm conditions that have been flagged. These indications may vary from installation to installation and may be programmed into the memory 91 via keyboards 92 (50,51). Such indications are known in the art and will not be discussed in detail herein. The alarm program also places a record of the alarm event in memory 91. This record may be assessed via keyboards 92 or remote terminal 49. When the appropriate indications have been given and the record stored, the system returns to the program it exited.

As has been described above, the combination of the external and internal sensors in one system permit more detailed analysis of the tank situation. Moreover, as has been disclosed, the combined system makes it possible to discard alarms that may be suspect. Further, the combined system permits probes to be set at more sensitive detection levels without increasing, and even decreasing false alarms. In particular, the inventory calculation can in practice be made much more accurately; this is believed to be due to the increased information serving to smooth out the errors in the calculation in much the same way that information on additional variables improve the accuracy of calculation of the solution of simultaneous equations. Thus the accuracy and reliability of the combined system is increased much more dramatically than would be expected from simply adding together the capabilities of the two independent systems.

A novel tank inventory and leak detection system which makes electronic tank gauging practical has been described which has many other advantages. It is evident that those skilled in the art may now make many uses and modifications of the specific embodiment described without departing from the inventive concepts. For example, different level, leak and other probes may be used. The software may be reconfigured, for example, with the decision criteria being employed in the alarm program in some instances rather than in the Monitoring Mode. Equivalent electronic components and circuits may be substituted. Consequently, the invention is to be construed as embracing each and every novel feature and novel combination of features present in the fluid status detection system described.

What is claimed is:

1. Tank inventory and leak detection apparatus for detecting the status of a liquid storage system and its contents, said apparatus comprising:
   external detection means for detecting one or more conditions of liquid external of said storage system and for providing an external liquid signal;
   internal detection means for detecting one or more conditions of liquid internal of said storage system and for producing an internal liquid signal;
   means for storing decision criteria relating one or more of said external liquid conditions and one or more of said internal liquid conditions; and
   indicating means communicating with said means for storing and responsive to said external liquid signal and said internal liquid signal for providing an indication of the status of said liquid storage system and its contents.

2. The apparatus of claim 1 wherein said external detection means comprises a collecting means for detecting the presence of small quantities of hydrocarbon liquid.

3. The apparatus of claim 2 wherein said external detection means further comprises float means configured to fit within said collecting means and occupy the major portion of its volume at the liquid-float interface, and a sensing means attached to said float for providing said external liquid signal.

4. The apparatus of claim 2 wherein said external detection means comprises a vapor sensor and a means for locating said vapor sensor between the walls of and near the bottom of said double-walled tank.

5. The apparatus of claim 2 wherein said internal detection means comprises measurement means for measuring the quantity of liquid in said storage system.

6. The apparatus of claim 5 wherein said measurement means comprises liquid level means for measuring the liquid level in the storage system and at least one temperature sensor means for sensing the temperature of the liquid in the storage system.

7. The apparatus of claim 1 wherein said means for storing comprises means for storing decision criteria for determining the location of a leak in said liquid storage system and said indicating means includes means for indicating the location of said leak in said liquid storage system.

* * * * *